United States Patent
Wang et al.

(10) Patent No.: US 11,798,132 B2
(45) Date of Patent: Oct. 24, 2023

(54) IMAGE INPAINTING METHOD AND APPARATUS, COMPUTER DEVICE, AND STORAGE MEDIUM

(71) Applicant: TENCENT TECHNOLOGY (SHENZHEN) COMPANY LIMITED, Guangdong (CN)

(72) Inventors: Yi Wang, Shenzhen (CN); Xin Tao, Shenzhen (CN); Jia Ya Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 358 days.

(21) Appl. No.: 17/188,449

(22) Filed: Mar. 1, 2021

(65) Prior Publication Data
US 2021/0183022 A1 Jun. 17, 2021

Related U.S. Application Data

(63) Continuation of application No. PCT/CN2019/011958, filed on Nov. 20, 2019.

(30) Foreign Application Priority Data

Nov. 29, 2018 (CN) .......................... 201811442428.6

(51) Int. Cl.
*G06K 9/00* (2022.01)
*G06T 3/40* (2006.01)
(Continued)

(52) U.S. Cl.
CPC .............. *G06T 3/4053* (2013.01); *G06N 3/08* (2013.01); *G06T 3/4007* (2013.01); *G06T 5/005* (2013.01);
(Continued)

(58) Field of Classification Search
CPC ..... G06T 3/4053; G06T 3/4007; G06T 5/005; G06T 2207/20076; G06T 2207/20081;
(Continued)

(56) References Cited

FOREIGN PATENT DOCUMENTS

| CN | 1758283 A | 4/2006 |
|---|---|---|
| CN | 106097268 A * | 11/2016 ............. G06T 5/005 |

(Continued)

OTHER PUBLICATIONS

Yi Wang et al., "Image Inpainting via Generative Multi-column Convolutional Neural Networks", [arXiv], Web of Science [v.5.35], Oct. 20, 2018, pp. 1-10.
(Continued)

*Primary Examiner* — Xin Jia
(74) *Attorney, Agent, or Firm* — Sughrue Mion, PLLC

(57) ABSTRACT

Embodiments of the disclosure disclose a method, an apparatus, a computer device, and a storage medium for inpainting an image. In an embodiment, an image inpainting method includes: determining, from a target image, a first region to be inpainted and a second region that is not to be inpainted; performing feature extraction on the second region based on different receptive fields and spatial resolutions, to obtain feature information of a plurality of scales; generating a texture of the first region based on the feature information of the plurality of scales; and filling the first region in the target image with the generated texture, to obtain an inpainted image.

18 Claims, 11 Drawing Sheets

(51) Int. Cl.
  *G06N 3/08* (2023.01)
  *G06T 5/00* (2006.01)
  *G06V 10/764* (2022.01)
  *G06V 10/82* (2022.01)

(52) U.S. Cl.
  CPC ............ *G06V 10/764* (2022.01); *G06V 10/82* (2022.01); *G06T 2207/20076* (2013.01); *G06T 2207/20081* (2013.01); *G06T 2207/20084* (2013.01)

(58) Field of Classification Search
  CPC . G06T 2207/20084; G06T 2207/20016; G06T 2207/20104; G06T 5/001; G06T 11/40; G06N 3/08; G06N 3/045; G06N 7/01; G06V 10/764; G06V 10/82
  See application file for complete search history.

(56) References Cited

FOREIGN PATENT DOCUMENTS

| | | | |
|---|---|---|---|
| CN | 106485656 A | * | 3/2017 |
| CN | 107492082 A | | 12/2017 |
| CN | 109584178 A | | 4/2019 |

OTHER PUBLICATIONS

First Office Action of Chinese Application No. 201811442428.6 dated May 14, 2020.
Second Office Action of Chinese Application No. 201811442428.6 dated Jan. 20, 2021.
International Search Report of PCT/CN2019/119588 dated Feb. 21, 2020 [PCT/ISA/210].
Written Opinion of PCT/CN2019/119588 dated Feb. 21, 2020 [PCT/ISA/237].

* cited by examiner

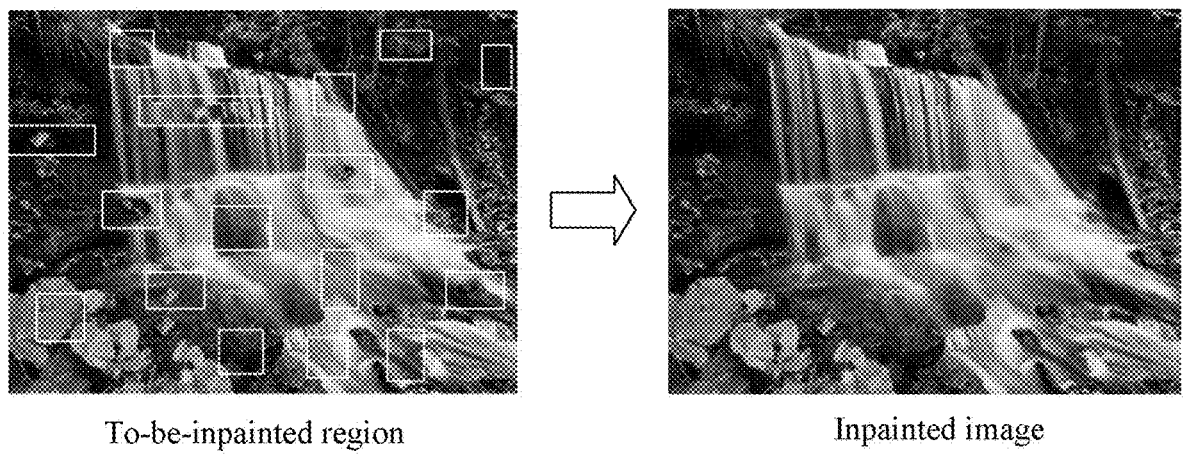

To-be-inpainted region → Inpainted image

FIG. 2E

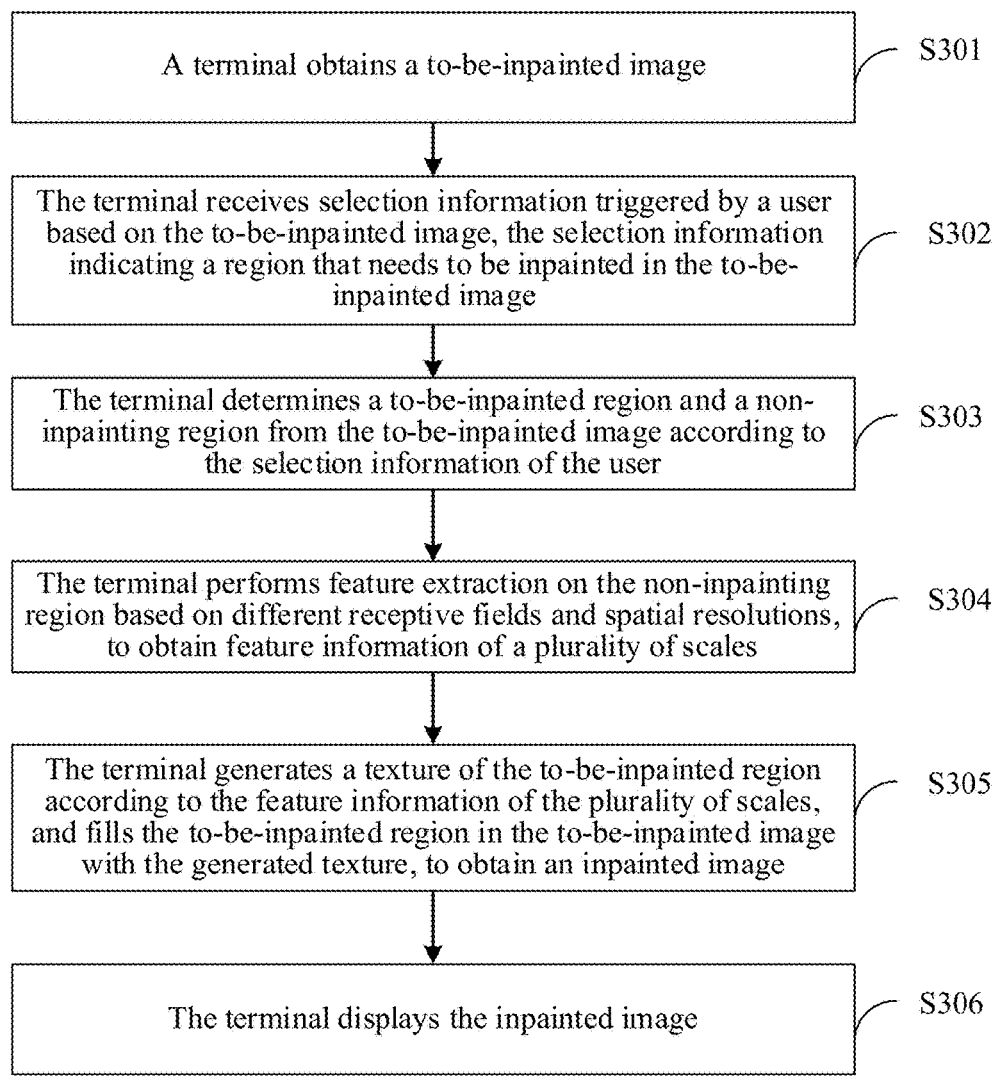

| A terminal obtains a to-be-inpainted image | S301 |

| The terminal receives selection information triggered by a user based on the to-be-inpainted image, the selection information indicating a region that needs to be inpainted in the to-be-inpainted image | S302 |

| The terminal determines a to-be-inpainted region and a non-inpainting region from the to-be-inpainted image according to the selection information of the user | S303 |

| The terminal performs feature extraction on the non-inpainting region based on different receptive fields and spatial resolutions, to obtain feature information of a plurality of scales | S304 |

| The terminal generates a texture of the to-be-inpainted region according to the feature information of the plurality of scales, and fills the to-be-inpainted region in the to-be-inpainted image with the generated texture, to obtain an inpainted image | S305 |

| The terminal displays the inpainted image | S306 |

FIG. 3A

IMAGE INPAINTING METHOD AND APPARATUS, COMPUTER DEVICE, AND STORAGE MEDIUM

CROSS-REFERENCE TO RELATED APPLICATION(S)

This application is a bypass continuation application of International Application No. PCT/CN2019/119588, filed on Nov. 20, 2019, which claims priority to Chinese Patent Application No. 201811442428.6, entitled "IMAGE INPAINTING METHOD AND APPARATUS AND STORAGE MEDIUM" filed with the China National Intellectual Property Administration on Nov. 29, 2018, the disclosures of which are herein incorporated by reference in their entireties.

FIELD

The disclosure relates to the field of communication technologies, and in particular, to an image inpainting method and apparatus, a computer device, and a storage medium therefor.

BACKGROUND

Image inpainting aims to reasonably fill a labeled region (that is, a to-be-inpainted labeled region) in an image, and is an important operation in image editing. Image inpainting may inpaint and reconstruct a damaged image and may also be used as a method for beautifying an image by removing defects, objects, watermarks, and the like in the image. The background of an image photographed on a street or a scenic spot usually includes unwanted objects such as pedestrians or sundries. Through image inpainting, these unwanted objects may be removed from the image, so that the display effect of the image is optimized.

There are technologies for image inpainting and one of them is a neural network-based image inpainting method. In most existing neural network-based image inpainting methods, single-scale feature recognition is used to determine a labeled region, and a texture of a known region is then migrated to the labeled region to implement inpainting.

SUMMARY

According to an aspect of an example embodiment, provided is an image inpainting method, performed by at least one processor of a computer device, the method including: determining, from a target image, a first region to be inpainted and a second region that is not to be inpainted; performing feature extraction on the second region based on different receptive fields and spatial resolutions, to obtain feature information of a plurality of scales; generating a texture of the first region based on the feature information of the plurality of scales; and filling the first region in the target image with the generated texture, to obtain an inpainted image.

The determining the first region and the second region from the target image may include: determining the first region from the target image based on a label of a user; generating a mask based on the first region; and determining the second region based on the mask.

The performing the feature extraction may include: obtaining a trained multi-column convolutional neural network, the trained multi-column convolutional neural network including a plurality of subnetworks connected in parallel, the different receptive fields and spatial resolutions being set for the plurality of subnetworks; and respectively performing the feature extraction on the second region by using the plurality of subnetworks, to obtain feature information corresponding to the plurality of subnetworks as the feature information of the plurality of scales.

The generating the texture may include: concatenating the feature information corresponding to the plurality of subnetworks, to obtain a concatenated feature map; mapping the concatenated feature map to an image space, to obtain a mapped image; and obtaining the texture of the first region from the mapped image.

The obtaining the texture may include: determining, as a target region, a region of which a position in the mapped image is the same as a position of the first region in the target image; and obtaining a texture of the target region as the texture of the first region.

The method may further include: acquiring a plurality of image samples; randomly selecting a region from an image sample, of the plurality of image samples, as a labeled region; masking the labeled region in the image sample, to obtain a training sample; predicting a texture of the labeled region in the training sample by using a preset multi-column convolutional neural network, to obtain a predicted image; and verifying the predicted image by using the image sample, to converge the preset multi-column convolutional neural network and obtain the trained multi-column convolutional neural network.

The masking the labeled region may include: generating a mask based on the labeled region; and concatenating the generated mask and the image sample, to obtain the training sample.

The predicting the texture of the labeled region may include: determining, based on the labeled region, a first sample region to be inpainted and a second sample region that is not to be inpainted in the training sample; performing multi-scale feature extraction on the second sample region of the training sample by using the preset multi-column convolutional neural network, to obtain feature information of a plurality of scales corresponding to the second sample region; generating a texture of the first sample region based on the obtained feature information of the plurality of scales corresponding to the second sample region; and filling the first sample region in the training sample with the generated texture, to obtain the predicted image.

The verifying the predicted image may include: constructing a reconstruction loss function, a regularization loss function, and an adversarial loss function according to the predicted image and the image sample; generating an optimization loss function according to the reconstruction loss function, the regularization loss function, and the adversarial loss function; and converging the preset multi-column convolutional neural network by using the optimization loss function, to obtain the trained multi-column convolutional neural network.

The constructing the reconstruction loss function may include: obtaining a mask corresponding to the labeled region, and performing convolution processing on the mask by using a Gaussian filter, to obtain a loss weight mask; and constructing the reconstruction loss function according to the loss weight mask, the image sample, and the predicted image.

The constructing the regularization loss function may include: classifying pixel types in the predicted image and the image sample by using an image classification model; obtaining an output value of the predicted image and an output value of the image sample in each convolutional layer of the image classification model during classification; calculating an implicit diversity Markov random field (ID-MRF) loss between the output value of the predicted image and the output value of the image sample in each convolutional layer; and constructing the regularization loss function according to the calculated ID-MRF loss of each convolution layer.

The constructing the adversarial loss function may include: calculating an interpolation between the predicted image and the image sample; processing the interpolation by using a preset discriminator, to obtain a probability corresponding to the interpolation; processing the predicted image by using the preset discriminator, to obtain a probability corresponding to the predicted image; obtaining a mask corresponding to the labeled region, and performing convolution processing on the mask by using a Gaussian filter, to obtain a loss weight mask; and constructing the adversarial loss function according to the probability corresponding to the interpolation, the probability corresponding to the predicted image, and the loss weight mask.

The determining a to-be-inpainted region and a non-inpainting region from the target image may include: receiving selection information of a user on a region that is to be inpainted in the target image; and determining the first region and the second region from the target image according to the selection information of the user.

According to an aspect of an example embodiment, provided is a non-transitory computer-readable storage medium, storing computer-readable program instructions, the computer-readable program instructions being executable by at least one processor to perform: determining, from a target image, a first region to be inpainted and a second region that is not to be inpainted; performing feature extraction on the second region based on different receptive fields and spatial resolutions, to obtain feature information of a plurality of scales; generating a texture of the first region according to the feature information of the plurality of scales; and filling the first region in the target image with the generated texture, to obtain an inpainted image.

According to an aspect of an example embodiment, provided is an image inpainting apparatus, including: at least one memory configured to store program code; and at least one processor configured to read the program code and operate as instructed by the program code, the program code including: determining code configured to cause at least one of the at least one processor to: determine, from a target image, a first region to be inpainted and a second region that is not to be inpainted; extraction code configured to cause at least one of the at least one processor to perform feature extraction on the second region based on different receptive fields and spatial resolutions, to obtain feature information of a plurality of scales; generation code configured to cause at least one of the at least one processor to generate a texture of the first region based on the feature information of the plurality of scales; and filling code configured to cause at least one of the at least one processor to fill the first region in the target image with the generated texture, to obtain an inpainted image.

The determining code may be further configured to cause at least one of the at least one processor to: determine the first region from the target image based on a label of a user; generate a mask based on the first region; and determine the second region in the target image based on the mask.

The extraction code may be further configured to cause at least one of the at least one processor configured to: obtain a trained multi-column convolutional neural network, the trained multi-column convolutional neural network including a plurality of subnetworks connected in parallel, the different receptive fields and spatial resolutions being set for the plurality of subnetworks; and respectively perform the feature extraction on the second region by using the plurality of subnetworks, to obtain feature information corresponding to the plurality of subnetworks as the feature information of a plurality of scales.

The generation code may be further configured to cause at least one of the at least one processor configured to: concatenate the feature information corresponding to the plurality of subnetworks, to obtain a concatenated feature map; map the concatenated feature map to an image space, to obtain a mapped image; and obtain the texture of the first region from the mapped image.

The generation code may be further configured to cause at least one of the at least one processor configured to: determine, as a target region, a region of which a position in the mapped image is the same as a position of the first region in the target image; and obtain a texture of the target region as the texture of the to-be-inpainted region.

The program code may further include: selection code configured to cause at least one of the at least one processor to randomly select a region from an image sample as a labeled region; masking code configured to cause at least one of the at least one processor to mask the labeled region in the image sample, to obtain a training sample; prediction code configured to cause at least one of the at least one processor to predict a texture of the labeled region in the training sample by using a preset multi-column convolutional neural network, to obtain a predicted image; and convergence code configured to cause at least one of the at least one processor to verify the predicted image by using the image sample, to converge the preset multi-column convolutional neural network and obtain a trained multi-column convolutional neural network.

BRIEF DESCRIPTION OF THE DRAWINGS

To describe the technical solutions in the embodiments of the disclosure more clearly, the following briefly describes the accompanying drawings required for describing the embodiments. Apparently, the accompanying drawings in the following description show merely some embodiments of the disclosure, and a person skilled in the art may still derive other drawings from these accompanying drawings without creative efforts.

FIG. 2E is an example diagram of an effect of an image inpainting method according to an embodiment of the disclosure.

FIG. 3A is still another schematic flowchart of an image inpainting method according to an embodiment of the disclosure.

DETAILED DESCRIPTION

Figure 1A:
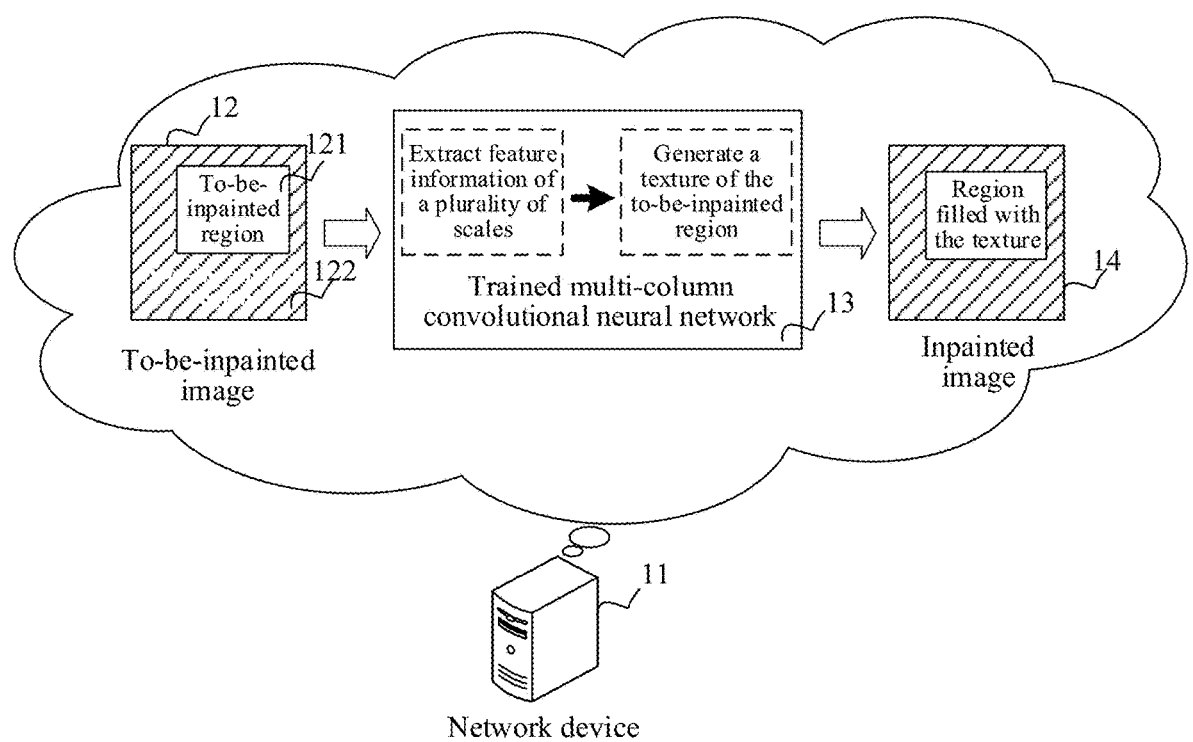
FIG. 1A is a schematic diagram of a scenario of an image inpainting method according to an embodiment of the disclosure.

The following clearly and completely describes the technical solutions in embodiments of the disclosure with reference to the accompanying drawings in the embodiments of the disclosure. Apparently, the described embodiments are some embodiments of the disclosure rather than all of the embodiments. All other embodiments obtained by a person skilled in the art based on the embodiments of the disclosure without creative efforts fall within the scope of the disclosure.

Artificial Intelligence (AI) technology is a comprehensive discipline, and relates to a wide range of fields including both hardware-level technologies and software-level technologies. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning/deep learning (DL).

Currently, DL is one of the technology and research fields of machine learning. Artificial intelligence (AI) is implemented in a computer system by establishing an artificial neural network having a hierarchical structure.

With the successful application of DL in the field of vision, researchers also introduce DL into the field of image processing, for example, apply DL to image inpainting.

However, a texture generated by the related art image inpainting is relatively monotonous. Therefore, for a target with high structural strength or a large region, artifacts are prone to appear, and authenticity is poor, resulting in an inadequate inpainting effect.

In view of this, embodiments of the disclosure provide an image inpainting method and apparatus, and a storage medium therefor that solve these problems in the related art.

An image inpainting apparatus may be integrated in a network device, for example, a computer device such as a server or a terminal. For example, referring to FIG. 1, a network device 11 may obtain a target image (or a to-be-inpainted image) 12, and determine a to-be-inpainted region 121 (a blank region in FIG. 1) and a non-inpainting region 122 (for example, a region filled with oblique lines in FIG. 1) from the target image 12; then perform feature extraction on the non-inpainting region 122 based on different receptive fields and spatial resolutions, for example, perform multi-scale feature extraction on the non-inpainting region 122 by using a trained multi-column convolutional neural network 13, to obtain feature information of a plurality of scales; generate a texture of the to-be-inpainted region 121 according to the feature information of the plurality of scales; and fill the to-be-inpainted region 121 in the target image 12 with the generated texture, to obtain an inpainted image 14.

The trained multi-column convolutional neural network may include a plurality of subnetworks connected in parallel, and different subnetworks are provided with different receptive fields and spatial resolutions, to extract feature information of different scales. The multi-column convolutional neural network may be obtained by training a plurality of image samples.

Detailed descriptions of example embodiments are provided below. Sequence numbers of the following embodiments are not intended to mean any preference orders of the embodiments.

In an example embodiment, description is made from the perspective of an image inpainting apparatus. The image inpainting apparatus may be integrated in a network device, for example, a device such as a server or a terminal. The terminal may include a mobile phone, a tablet computer, a notebook computer, and/or a personal computer (PC).

The embodiments of the disclosure provide an image inpainting method, including: obtaining a target image, and determining a to-be-inpainted region and a non-inpainting region from the target image; performing feature extraction on the non-inpainting region based on different receptive fields and spatial resolutions, to obtain feature information of a plurality of scales; generating a texture of the to-be-inpainted region according to the feature information of the plurality of scales; and filling the to-be-inpainted region in the target image with the generated texture, to obtain an inpainted image.

Figure 1B:
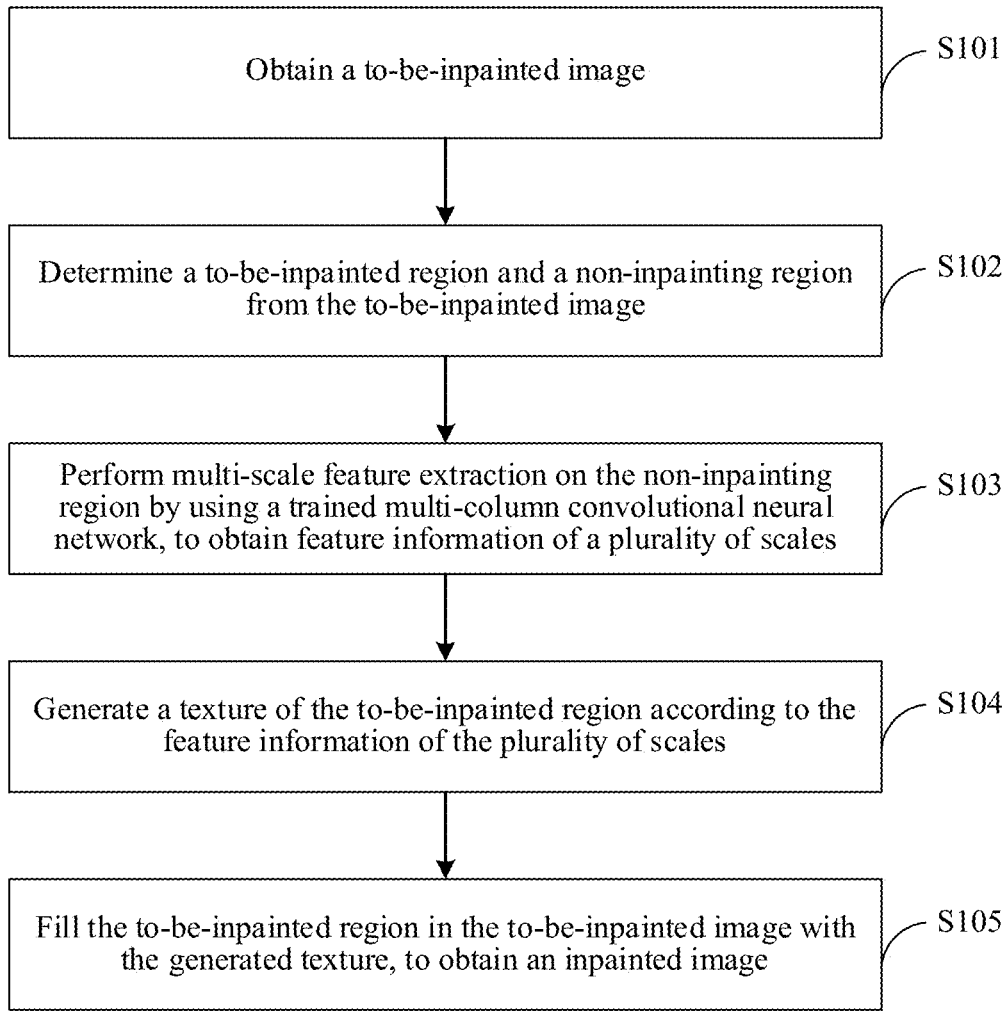
FIG. 1B is a schematic flowchart of an image inpainting method according to an embodiment of the disclosure.

The image inpainting method provided in the embodiments of the disclosure may be performed by a computer device. As shown in FIG. 1B, an example procedure of the method may include the following operations S101-S105:

S101. Obtain a target image (or a to-be-inpainted image), the target image being an image that is to be inpainted.

For example, specifically, the target image may be read locally (that is, in the image inpainting apparatus), or the target image may be obtained from another device.

S102. Determine a to-be-inpainted region and a non-inpainting region from the target image.

Figure 1C:
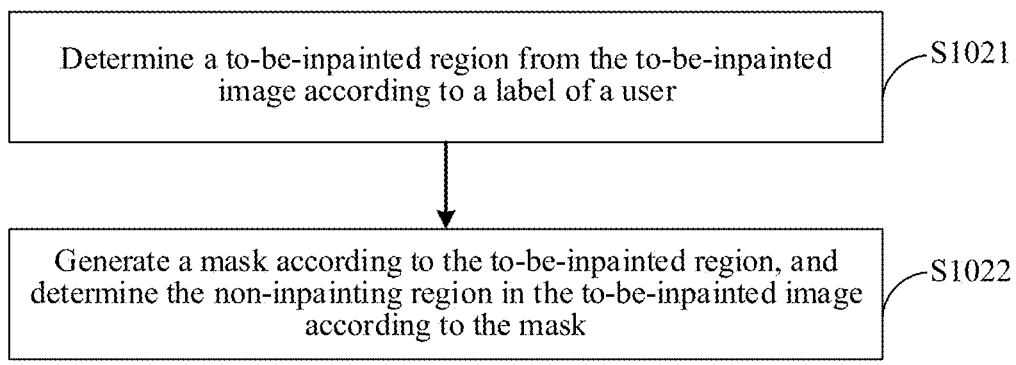
FIG. 1C is a schematic flowchart of determining a to-be-inpainted region and a non-inpainting region according to an embodiment of the disclosure.

FIG. 1C is a flowchart of determining a to-be-inpainted region and a non-inpainting region according to an embodiment of the disclosure. As shown in FIG. 1C, a procedure may include the following operations S1021-S1022:

S1021. Determine a to-be-inpainted region from the target image (or to-be-inpainted image), according to a label of a user.

If the target image already includes the label of the user (the label indicates a region that is to be inpainted), the to-be-inpainted region may be directly determined from the target image according to the label of the user. If the target image does not include the label of the user, the label of the user may be received, and the to-be-inpainted region is then determined from the target image according to the label of the user.

S1022. Generate a mask (e.g., BitMask) according to the to-be-inpainted region, and determine the non-inpainting region in the target image according to the mask.

The mask represents a series of binary digits in computer science and digital logic. Through a bit-wise operation of the mask and a target digit, a specified bit may be covered to meet requirements. In the mask, each binary bit has two values: 0 (False) or 1 (True). Through the mask, the non-inpainting region in the target image may be covered. For example, the value of the to-be-inpainted region in the target image may be set to 1, and the value of another region may be set to 0. In this case, the region with the value of 0 may be determined as the non-inpainting region. The formula is as follows:

$$X=Y\odot(1-M).$$

X is the non-inpainting region, Y is the to-be-inpainted region, M is the mask, and $\odot$ is an operation of multiplying corresponding elements.

S103. Perform feature extraction on the non-inpainting region based on different receptive fields and spatial resolutions, to obtain feature information of a plurality of scales.

Figure 1D:
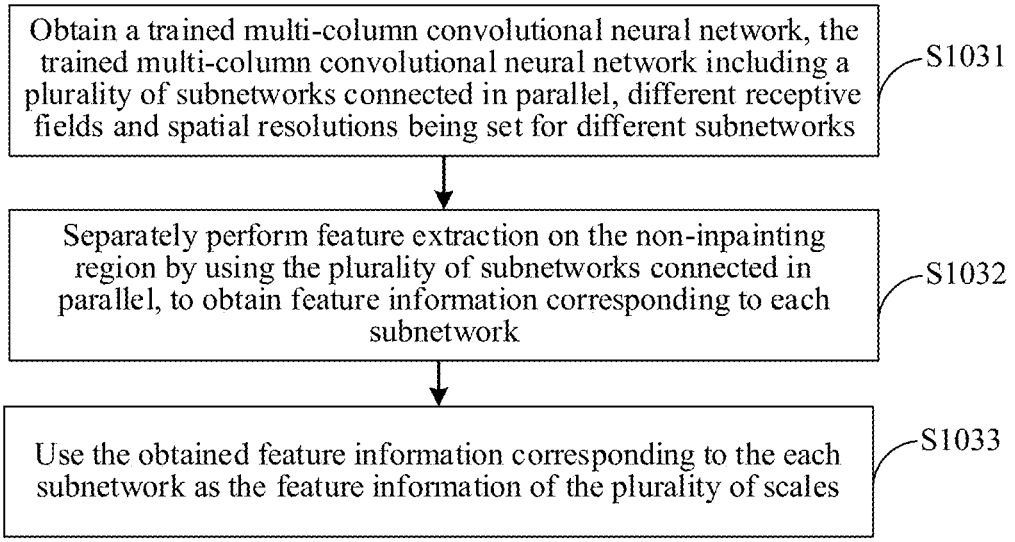
FIG. 1D is a specific flowchart of operation S103 according to an embodiment of the disclosure.

In some embodiments, FIG. 1D is a flowchart of operation S103 in which feature extraction is performed on the non-inpainting region based on different receptive fields and spatial resolutions, to obtain feature information of a plurality of scales. As shown in FIG. 1D, the procedure includes the following operations S1031-S1033:

S1031. Obtain a trained multi-column convolutional neural network, the trained multi-column convolutional neural network including a plurality of subnetworks connected in parallel, different receptive fields and spatial resolutions being set for different subnetworks.

S1032. Separately perform feature extraction on the non-inpainting region by using the plurality of subnetworks connected in parallel, to obtain feature information corresponding to each subnetwork.

S1033. Use the obtained feature information corresponding to the each subnetwork as the feature information of the plurality of scales.

For example, the procedure may include: obtaining a trained multi-column convolutional neural network, and performing multi-scale feature extraction on the non-inpainting region by using the trained multi-column convolutional neural network, to obtain the feature information of the plurality of scales.

Figure 1E:
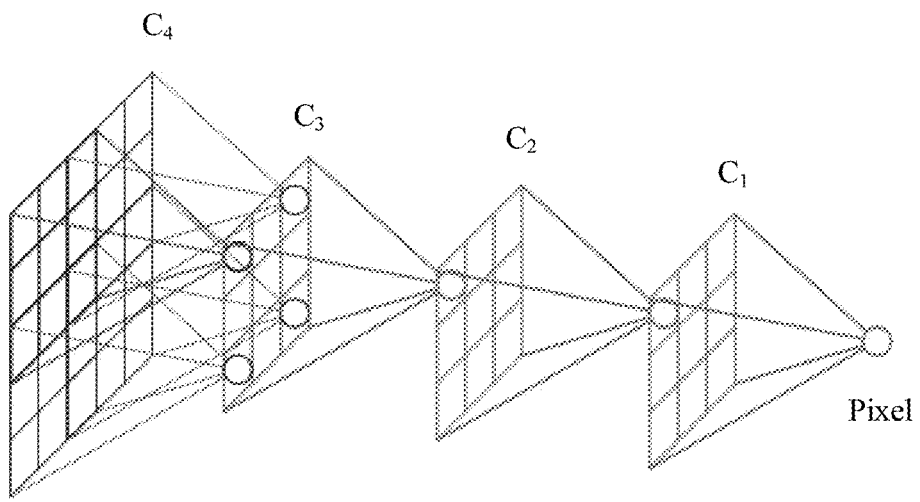
FIG. 1E is a schematic diagram of a receptive field in an image inpainting method according to an embodiment of the disclosure.

The trained multi-column convolutional neural network may include a plurality of subnetworks connected in parallel, and different receptive fields and spatial resolutions are set for different subnetworks, to extract feature information of different scales. The spatial resolution is a number of pixels in the target image per unit size, and the unit size herein may be, for example, an inch or the like. In a convolutional neural network, the receptive field determines a region size of an input layer corresponding to an element in an output result of a layer. That is, the receptive field is a size, mapped on an input image, of an element point of an output result of a layer in the convolutional neural network (that is, a feature map). FIG. 1E is a schematic diagram of a receptive field in an image inpainting method according to an embodiment of the disclosure. Referring to FIG. 1E, a receptive field size of an output feature map pixel of a first convolutional layer (for example, $C_1$) is equal to a convolution kernel size (a filter size), while a receptive field size of a deep convolutional layer (for example, $C_4$) is related to convolution kernel sizes and operation sizes of all layers before the deep convolutional layer. Therefore, based on different receptive fields and using different spatial resolutions, different levels of information may be captured, so as to extract the feature information of different scales. That is, the operation of "performing multi-scale feature extraction on the non-inpainting region by using the trained multi-column convolutional neural network, to obtain the feature information of the plurality of scales" may include:

separately performing feature extraction on the non-inpainting region by using the plurality of subnetworks connected in parallel, to obtain feature information corresponding to each subnetwork.

Both a quantity of subnetworks and network parameters may be determined according to requirements of an actual application. For example, if three subnetworks connected in parallel are used as an example, the structure of the trained multi-column convolutional neural network may be shown in FIG. 1F.

Figure 1F:
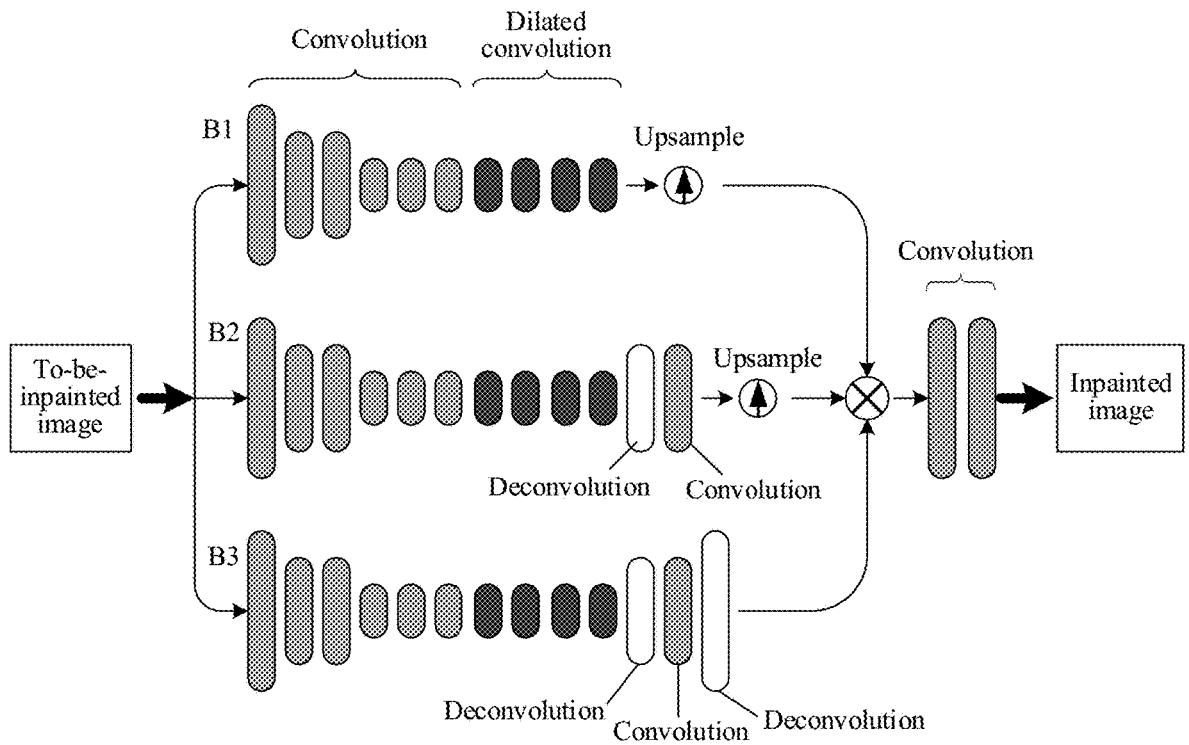
FIG. 1F is a schematic structural diagram of a trained multi-column convolutional neural network according to an embodiment of the disclosure.

Referring to FIG. 1F, the trained multi-column convolutional neural network may include a subnetwork B1, a subnetwork B2, and a subnetwork B3. Each subnetwork may include an encoder part and a decoder part, and the structures and parameters of the decoder part and the encoder part used by the each subnetwork may all be determined according to requirements for an actual application as follows:

The encoder part of B1 may sequentially include six convolutional layers, the decoder part may sequentially include four dilated convolutional layers, and a convolution kernel size (a filter size) may be set to "7×7".

The encoder part of B2 may sequentially include six convolutional layers, the decoder part may sequentially include four dilated convolutional layers, one deconvolution layer, and one convolutional layer, and a convolution kernel size may be set to "5×5".

The encoder part of B3 may sequentially include six convolutional layers, the decoder part may sequentially include four dilated convolutional layers, one deconvolution layer, one convolutional layer, and one deconvolution layer, and a convolution kernel size may be set to "3×3", or the like.

That is, in this case, feature extraction may be performed on the non-inpainting region in the target image by using the subnetworks B1, B2, and B3 respectively, to obtain feature information corresponding to the subnetwork B1, feature information corresponding to the subnetwork B2 and feature information corresponding to the subnetwork B3.

S104. Generate a texture of the to-be-inpainted region according to the feature information of the plurality of scales.

For example, an example in which the trained multi-column convolutional neural network may include the plurality of subnetworks connected in parallel may be used. If the feature information corresponding to the each subnetwork is obtained in operation S103, the texture of the to-be-inpainted region may be generated according to the feature information of the plurality of scales.

Figure 1G:
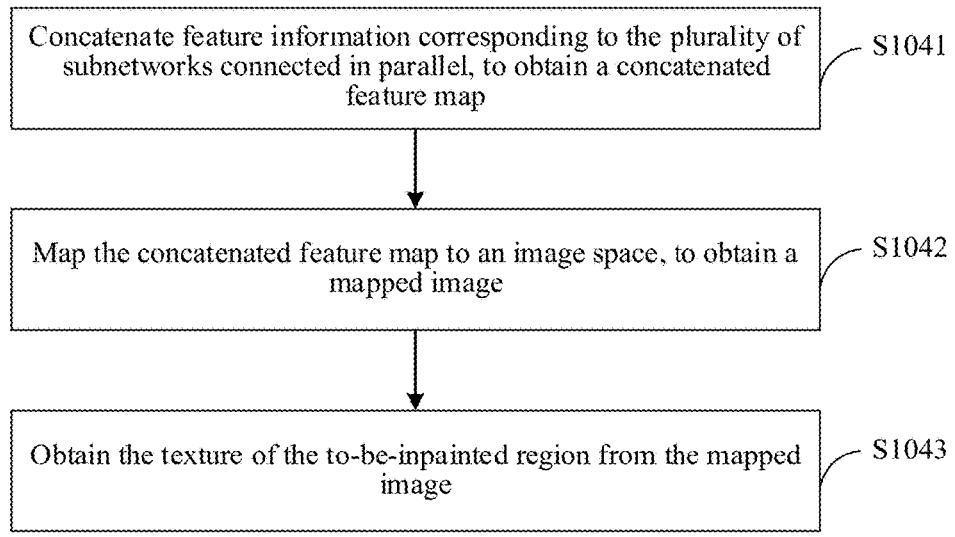
FIG. 1G is a specific flowchart of generating a texture of a to-be-inpainted region according to feature information corresponding to a plurality of subnetworks connected in parallel according to an embodiment of the disclosure.

In some embodiments, FIG. 1G is a specific flowchart of generating a texture of a to-be-inpainted region according to the feature information corresponding to a plurality of subnetworks connected in parallel. As shown in FIG. 1, an example procedure may include the following operations S1041-S1043:

S1041. Concatenate the feature information corresponding to the plurality of subnetworks connected in parallel, to obtain a concatenated feature map.

S1042. Map the concatenated feature map to an image space, to obtain a mapped image.

S1043. Obtain the texture of the to-be-inpainted region from the mapped image.

For example, the procedure may include: mapping the concatenated feature map to an image space by using a shared decoding module, to obtain a mapped image. The shared decoding module may be implemented by using a plurality of convolutional layers, and a quantity of convolutional layers may be determined according to requirements for an actual application. For example, referring to FIG. 1F, the shared decoding module may be implemented by using two convolutional layers.

There may be a plurality of manners of obtaining the texture of the to-be-inpainted region from the mapped image. For example, first, a position of the to-be-inpainted region in the target image may be determined; a region whose position in the mapped image is the same as the position is used as a target region, and a texture of the target region is obtained as the texture of the to-be-inpainted region.

If spatial resolutions of feature information (e.g., feature maps) outputted by some subnetworks are different from spatial resolutions of an originally inputted target image, to better concatenate outputs of these subnetworks, an upsampling operation may further be performed by using the feature information outputted by the subnetworks, to adjust the spatial resolutions of the feature information to the original spatial resolutions (e.g., the spatial resolutions of the originally inputted target image).

For example, referring to FIG. 1F, it may be learned from the figure that, both spatial resolutions outputted by the subnetwork B1 and the subnetwork B2 are different from that of an inputted target image. Therefore, in this case, after the spatial resolutions of the feature information is upsampled to the original spatial resolution, feature information outputted by B1, B2, and B3 may then be concatenated, to obtain a concatenated feature map. The concatenated feature map is then mapped to the image space, for example, a convolution operation may be performed on the concatenated feature map by using the plurality of convolutional layers, to obtain a mapped image. Next, a texture of the to-be-inpainted region may be obtained from the mapped image.

S105. Fill the to-be-inpainted region in the target image with the generated texture, to obtain an inpainted image.

For example, the procedure may include: filling the to-be-inpainted region with the generated texture by using a migration learning algorithm, to obtain an inpainted region, and then concatenating the inpainted region and the non-inpainting region, to obtain the inpainted image. This is expressed by using a formula as follows:

$$\hat{Y} = Y \odot (1-M) + G([X,M]) \odot M$$

$\hat{Y}$ is the inpainted image, Y is the to-be-inpainted region, X is the non-inpainting region, M is the mask, $Y \odot (1-M)$ is the non-inpainting region, $G([X, M])$ is the inpainted region, and $\odot$ is an operation of multiplying corresponding elements, where all inputs and output may be linearly adjusted between −1 and 1.

The trained multi-column convolutional neural network may be preset by operation and maintenance personnel, or may be obtained through training by the image inpainting apparatus. That is, before the operation of "obtaining a trained multi-column convolutional neural network", the image inpainting method may further include:

collecting a plurality of image samples, and training a preset multi-column convolutional neural network according to the image samples, to obtain the trained multi-column convolutional neural network.

Figure 1H:
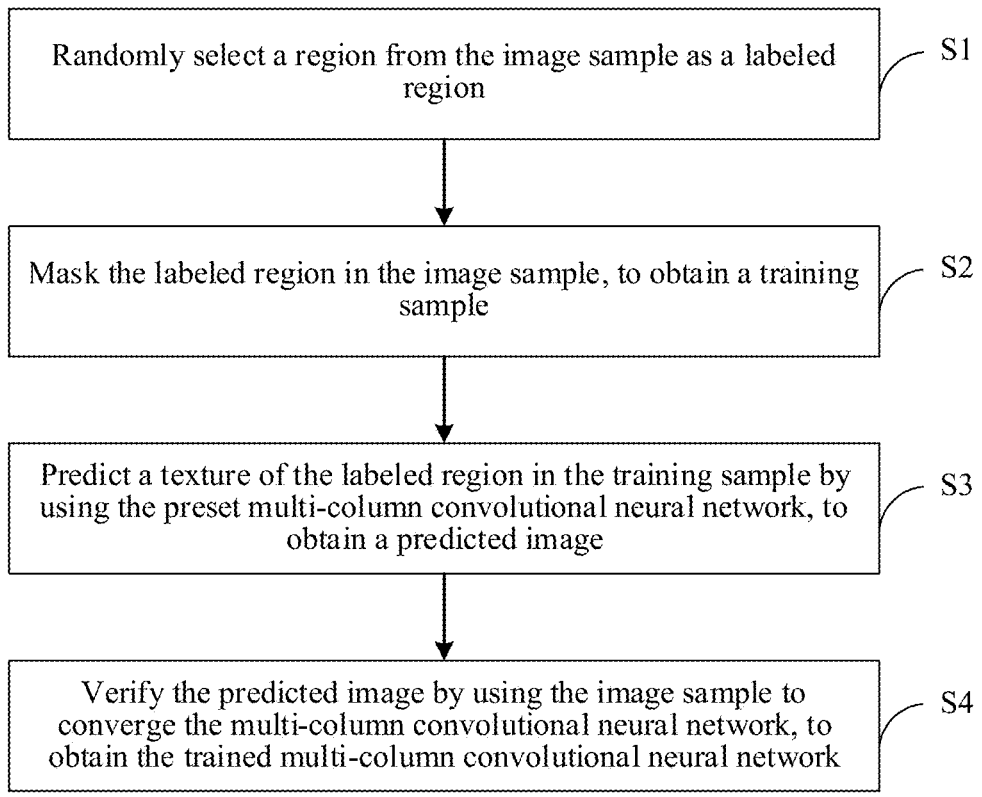
FIG. 1H is a flowchart of training a multi-column convolutional neural network according to an embodiment of the disclosure.

There may be a plurality of manners of training the multi-column convolutional neural network. FIG. 1H is a flowchart of training a multi-column convolutional neural network according to an embodiment of the disclosure. As shown in FIG. 1H, the procedure may include the following operations S1-S4:

S1. Randomly select a region from the image sample as a labeled region.

Figure 1I:
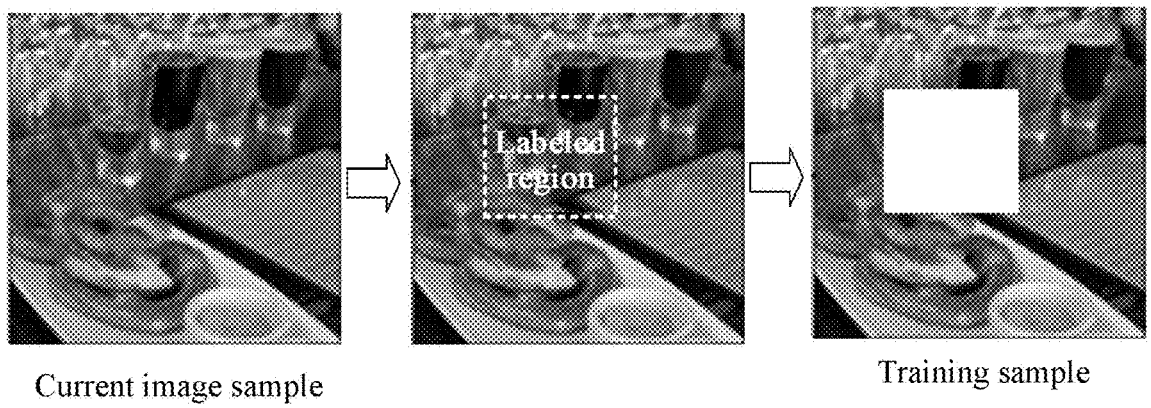
FIG. 1I is an example diagram of selecting a training sample in an image inpainting method according to an embodiment of the disclosure.

For example, referring to FIG. 1I, the procedure may include: randomly selecting an image sample from the acquired plurality of image samples as a current image sample, then using a region randomly selected from the current image sample as the labeled region (referring to a region within a dotted box in FIG. 1I).

S2. Mask the labeled region in the image sample, to obtain a training sample.

For example, the procedure may include: generating a mask according to the labeled region, and concatenating the generated mask and the image sample, to obtain the training sample.

For example, in the mask, a value in the labeled region may be set to 0, and a mask value outside the labeled region is set to 1. The generated mask and the image sample are then concatenated. In this way, referring to FIG. 1I, the labeled region may be masked in the image sample, to obtain the training sample.

S3. Predict a texture of the labeled region in the training sample by using the preset multi-column convolutional neural network, to obtain a predicted image. For example, details may be as follows:

determining a to-be-inpainted sample region and a non-inpainting sample region in the training sample according to the labeled region (that is, determining the to-be-inpainted region in the training sample according to the labeled region, to obtain the to-be-inpainted sample region; and determining the non-inpainting region in the training sample according to the labeled region, to obtain a non-inpainting sample region); performing multi-scale feature extraction on the non-inpainting region by using the preset multi-column convolutional neural network, to obtain feature information of a plurality of scales corresponding to the non-inpainting sample region; generating a texture of the to-be-inpainted sample region according to the obtained feature information of the plurality of scales; and filling the to-be-inpainted sample region in the training sample with the generated texture, to obtain the predicted image.

The manner of determining a to-be-inpainted sample region and a non-inpainting sample region, the manner of performing multi-scale feature extraction, the method for generating a texture, and the method for filling the texture may be similar to the method used for processing a target image and inpainting the target image, as described above. For details, reference may be made to the foregoing embodiments. Details are not described herein.

S4. Verify the predicted image by using the image sample to converge the multi-column convolutional neural network, to obtain the trained multi-column convolutional neural network.

For example, the procedure may include: separately constructing a reconstruction loss function, a regularization loss function, and an adversarial loss function according to the predicted image and the image sample; then generating an optimization loss function according to the reconstruction loss function, the regularization loss function, and the adversarial loss function; and converging the multi-column convolutional neural network by using the optimization loss function, to obtain the trained multi-column convolutional neural network.

There may be a plurality of manners of constructing loss functions. For example, an example manner may be as follows:

(1) Reconstruction Loss Function

For example, a mask corresponding to the labeled region may be obtained, and convolution processing is performed on the mask by using a Gaussian filter, to obtain a loss weight mask. The reconstruction loss function is then constructed according to the loss weight mask, the image sample, and the predicted image.

Because a pixel reconstruction loss is very important for image inpainting, a reconstruction loss of a pixel is closely related to a spatial position of the pixel. For example, an unknown pixel close to a filling boundary needs to be more strongly constrained than that far from the filling boundary. Therefore, to constrain a reconstructed pixel based on the spatial position, the reconstruction loss function may be specifically set as a confidence-driven loss function, and the spatial position and a relative sequence are reflected by using a confidence of a known pixel and a confidence of an unknown pixel, so as to generate an effect of "gradually shifting a learning focus from a filling boundary to a center and smoothing a learning curve".

For example, the confidence of a known pixel may be set to 1, and the confidence of an unknown pixel may be set to a distance to the boundary. In addition, to propagate the confidence of the known pixel to the unknown pixel, a Gaussian filter g may be used to convolve the labeled mask M to create a loss weight mask $M_w^i$. This is expressed by using a formula as follows:

$$M_w^i = (g * \overline{M}^i) \odot M.$$

$\overline{M}^i = 1 - M + M_w^{i-1}$, and $M_w^0 = 0$. $M_w^i = (g * \overline{M}^i) \odot M$ is repeated a plurality of times (that is, i times) to generate $M_w$, where i is a positive integer.

After a final loss weight mask $M_w$ is obtained, a confidence-driven loss function may be constructed according to the final loss weight mask $M_w$, the image sample Y, and the predicted image $G([X, M]; \theta)$.

$$L_c = \|(Y - G([X,M];\theta)) \odot M_w\|_1$$

$G([X, M]; \theta)$ is the predicted image, and $\theta$ represents each network parameter of the multi-column convolutional neural network.

(2) Regularization Loss Function

Regularization may automatically weaken unimportant feature variables, and automatically extract "important feature variables" from many feature variables, thereby resolving a problem of overfitting. To avoid overfitting and make the generated texture structure more diversified, the network may be optimized by using the regularization loss function. There may be a plurality of manners of constructing the regularization loss function according to the predicted image and the image sample. For example, an example manner may be as follows:

separately classifying pixel types in the predicted image and the image sample by using an image classification model (visual geometry group, VGG); separately obtaining output values of the predicted image and the image sample in each convolutional layer of the image classification model during the classification; calculating an implicit diversity Markov random field (ID-MRF) loss between the output value of the predicted image and the output value of the image sample in the each convolutional layer; and constructing the regularization loss function according to the calculated ID-MRF loss of each layer.

An ID-MRF is a regularization manner similar to a Markov random field (MRF). The MRF is also referred to as a Markov network or an undirected graphical model, and the texture (including the structure) in the image may be reconstructed by using the MRF. Compared with the MRF, the ID-MRF may be more diverse in the reconstructed texture. The ID-MRF may minimize content generated by the network, and use the minimized content and a difference between nearest neighbors from a lossless image to optimize the network (that is, the ID-MRF may make full use of the reference and context information inside and outside the filling region). Because the ID-MRF is used only in training in this embodiment of the disclosure, and a complete real image is known, high-quality nearest neighbors may be provided, thereby greatly ensuring an optimization effect.

To calculate the ID-MRF loss, a direct similarity measurement (for example, a cosine similarity) may be simply used to find the nearest neighbors in the generated content. However, this process tends to generate a smooth structure, because a similar pattern is easily connected in a flat region, and structural changes are quickly reduced. Therefore, to restore subtle details, make the structure more diverse, and avoid over-smoothing, a relative distance measurement may be used to simulate a relationship between local features and a target feature set. For example, if the generated content (that is, the generated texture used for filling the to-be-inpainted sample region) in the predicted image $\hat{Y}$ is $\hat{Y}_g$, an output value of $\hat{Y}_g$ in an $L^{th}$ convolutional layer of a VGG network is $\hat{Y}_g^L$, an output value of the image sample Y in the $L^{th}$ convolutional layer of the VGG network is $Y^L$, an image block v is extracted from $\hat{Y}_g^L$, and an image block s is extracted from $Y^L$, a relative similarity RS(v, s) of v and s is that:

$$RS(v, s) = \exp\left(\left(\frac{\mu(v, s)}{\max_{r \in \rho_s(Y^L)} \mu(v, r) + \epsilon}\right) / h\right).$$

$\mu(v, s)$ is a cosine similarity between v and s.

$r \in \rho_s(Y^L)$ represents an image block belonging to $Y^L$ except for s. h and $\epsilon$ are two normal numbers, and may be set according to requirements for an actual application.

Subsequently, $\overline{RS}(v, s)$ may be calculated through $$RS(v, s) \Big/ \sum\nolimits_{r \in \rho_s(Y^L)} RS(v, r)$$

normalization. Finally, according to $\overline{RS}(v, s)$, an ID-MRF loss $L_M(L)$ of $\hat{Y}_g^L$ and $Y^L$ in each convolutional layer may be calculated as follows:

$$L_M(L) = -\log\left(\frac{1}{Z}\sum\nolimits_{s \in Y^L} \max_{v \in \hat{Y}_g^L} \overline{RS}(v, s)\right).$$

The ID-MRF loss $L_M(L)$ of $\hat{Y}_g^L$ and $Y^L$ may also be considered as "an ID-MRF loss between the output value of the predicted image and the output value of the image sample in the L convolutional layer".

After the ID-MRF loss between the output value of the predicted image and the output value of the image sample is obtained in the each convolutional layer, the regularization loss function may be constructed based on the calculated ID-MRF loss of the each layer. To avoid insufficient smoothing, or over-smoothing (over-smoothing is prone to generate artifacts), only ID-MRF losses of other parts of the convolutional layers may be selected to construct the regularization loss function. For example, only ID-MRF losses of middle and low levels of the convolutional layers are selected to construct the regularization loss function. That is, the operation of "constructing the regularization loss function according to the calculated ID-MRF loss of each layer" may include:

selecting, from the calculated ID-MRF loss of the each layer, the ID-MRF loss corresponding to the convolutional layer that meets a preset condition, and constructing the regularization loss function according to the selected ID-MRF loss corresponding to the convolutional layer.

A specific selected level may be determined according to used types of the VGG network. For example, if a VGG19 is used, in this case, ID-MRF losses of a third layer "conv3_2" and a fourth layer "conv4_2" may be selected to construct the regularization loss function $L_{mrf}$ as follows:

$$L_{mrf} = 2L_M(\text{conv4\_2}) + L_M(\text{conv3\_2}).$$

$L_M(\text{conv4\_2})$ is the ID-MRF loss of the fourth layer "conv4_2", and $L_M(\text{conv3\_2})$ is the ID-MRF loss of the third layer "conv3_2".

(3) Adversarial Loss Function

An adversarial loss is a catalyst for filling a missing region. Therefore, the filling of the texture may be optimized by using the adversarial loss function, so that a prediction result is kept geometrically consistent with a real model at different viewing angles (for example, a prediction point outside a geometry is adjusted inside the geometry). There may be a plurality of manners of constructing the adversarial loss function according to the predicted image and the image sample. For example, an example manner may be as follows:

calculating an interpolation between the predicted image and the image sample; processing the interpolation by using a preset discriminator, to obtain a probability corresponding to the interpolation; processing the predicted image by using the preset discriminator, to obtain a probability corresponding to the predicted image; obtaining a mask corresponding to the labeled region, and performing convolution processing on the mask by using a Gaussian filter, to obtain a loss weight mask; and constructing the adversarial loss function according to the probability corresponding to the interpolation, the probability corresponding to the predicted image, and the loss weight mask. This is expressed by using a formula as follows:

$$L_{adv} = -E_{X \sim \mathbb{P}_X}[D(G(X; \theta))] + \lambda_{gp} E_{\hat{X} \sim \mathbb{P}_{\hat{X}}}\left[\left(\|\Delta_{\hat{X}} D(\overline{X}) \odot M_w\|_2 - 1\right)^2\right].$$

$L_{adv}$ is the adversarial loss function, $\hat{X}$ is the interpolation between the predicted image and the image sample, and $\hat{X} = tG([X, M]; \theta) + (1-t)Y$, $t \in [0, 1]$. $D(\hat{X})$ is the probability corresponding to the interpolation $\hat{X}$, and $\Delta_{\hat{X}} D(\hat{X})$ is a derivative operation on $D(\hat{X})$ based on $\hat{X}$. $[D(G(X; \theta))]$ is the probability corresponding to the predicted image $G(X; \theta)$, $M_w$ is the loss weight mask, $\mathbb{P}_X$ and $\mathbb{P}_{\hat{X}}$ are respectively the distributions of $X$ and $\hat{X}$, $E_{X \sim \mathbb{P}_X}$ represents calculating an average after a plurality of x are extracted from $\mathbb{P}_X$, $E_{\hat{X} \sim \mathbb{P}_{\hat{X}}}$ represents calculating an average after a plurality of X are obtained from $\mathbb{P}_{\hat{X}}$, and $\lambda_{gp}$ is a regular term coefficient. This may be specifically set according to requirements for an actual application.

The discriminator (also referred to as an evaluator) may be determined according to requirements for an actual application. For example, the discriminator may include a global discriminator and a local discriminator.

The interpolation may be processed by using the preset global discriminator, to obtain a global probability corresponding to the interpolation, and the interpolation may be processed by using the local discriminator, to obtain a local probability corresponding to the interpolation. A direct mean of the global probability corresponding to the interpolation and the local probability corresponding to the interpolation is calculated, to obtain the probability corresponding to the interpolation.

Similarly, the predicted image is processed by using the preset global discriminator, to obtain a global probability corresponding to the predicted image, and the predicted image is processed by using the local discriminator, to obtain a local probability corresponding to the predicted image. A direct mean of the global probability corresponding to the predicted image and the local probability corresponding to the predicted image is calculated, to obtain the probability corresponding to the predicted image.

After the reconstruction loss function, the regularization loss function, and the adversarial loss function are obtained, an optimization loss function L may be generated according to the reconstruction loss function, the regularization loss function, and the adversarial loss function as follows:

$$L = L_c + \lambda_{mrf} L_{mrf} + \lambda_{adv} L_{adv}.$$

$\lambda_{mrf}$ and $\lambda_{adv}$ are regular term coefficients, which may be specifically set according to requirements for an actual application.

Subsequently, the multi-column convolutional neural network may be converged by using the optimization loss function, to obtain the trained multi-column convolutional neural network.

It may be learned from above that, in an example embodiment, after a target image is obtained, a to-be-inpainted region and a non-inpainting region may be determined from the target image, and feature extraction is performed on the non-inpainting region based on different receptive fields and spatial resolutions. A texture of the to-be-inpainted region is then generated according to the feature information of a plurality of scales obtained through the feature extraction, and the to-be-inpainted region in the target image is filled with the generated texture, to obtain an inpainted image. Because feature extraction may be performed from a plurality of scales according to an example embodiment, and a texture is generated based on the plurality of scales, the generated texture is more diverse. Accordingly, a target with high structural strength or a large region may be adequately inpainted, thereby greatly enhancing the authenticity of an inpainted region, and improving the inpainting effect.

According to the method described in the foregoing embodiments, the following provides further detailed description of example embodiments.

Description is made by using an example in which the image inpainting apparatus is integrated in the network device, and the network device establishes the trained multi-column convolutional neural network.

(1) Multi-Column Convolutional Neural Network

First, the network device may acquire a plurality of image samples. For example, the network device may obtain a large number of image samples from other image acquisition devices such as a video camera, a camera, and a monitor, or may read a large number of image samples from a gallery, or may obtain image samples through a network.

Second, the network device may randomly select an image sample from the acquired plurality of image samples as a current image sample, then randomly select a region from the current image sample as the labeled region, and mask the labeled region in the image sample, to obtain the training sample (that is, the image sample does not need to be manually labeled in advance, that is, the learning of the convolutional neural network is "unsupervised learning").

Furthermore, the network device may predict the texture of the labeled region in the training sample by using the preset multi-column convolutional neural network, to obtain a predicted image, and then verify the predicted image by using the image sample to converge the multi-column convolutional neural network, to obtain the trained multi-column convolutional neural network.

For example, the network device may determine a to-be-inpainted sample region and a non-inpainting sample region (the position of the labeled region being the to-be-inpainted region) in the training sample according to the labeled region; perform multi-scale feature extraction on the non-inpainting sample region by using the preset multi-column convolutional neural network, to obtain feature information of a plurality of scales corresponding to the non-inpainting sample region; generate a texture of the to-be-inpainted sample region according to the obtained feature information of the plurality of scales; and fill the to-be-inpainted sample region in the training sample with the generated texture, to obtain the predicted image. Subsequently, the network device then separately constructs a reconstruction loss function, a regularization loss function, and an adversarial loss function according to the predicted image and the image sample; then generates an optimization loss function according to the reconstruction loss function, the regularization loss function, and the adversarial loss function; and converges the multi-column convolutional neural network by using the optimization loss function, to obtain the trained multi-column convolutional neural network.

The preset multi-column convolutional neural network may include a plurality of subnetworks connected in parallel, and different receptive fields and spatial resolutions are set for different subnetworks, to extract feature information of different scales.

Each subnetwork may include an encoder part and a decoder part, and a quantity of subnetworks and the structures and parameters of the decoder part and the encoder part used by the each subnetwork may all be determined according to requirements for an actual application.

Figure 2A:
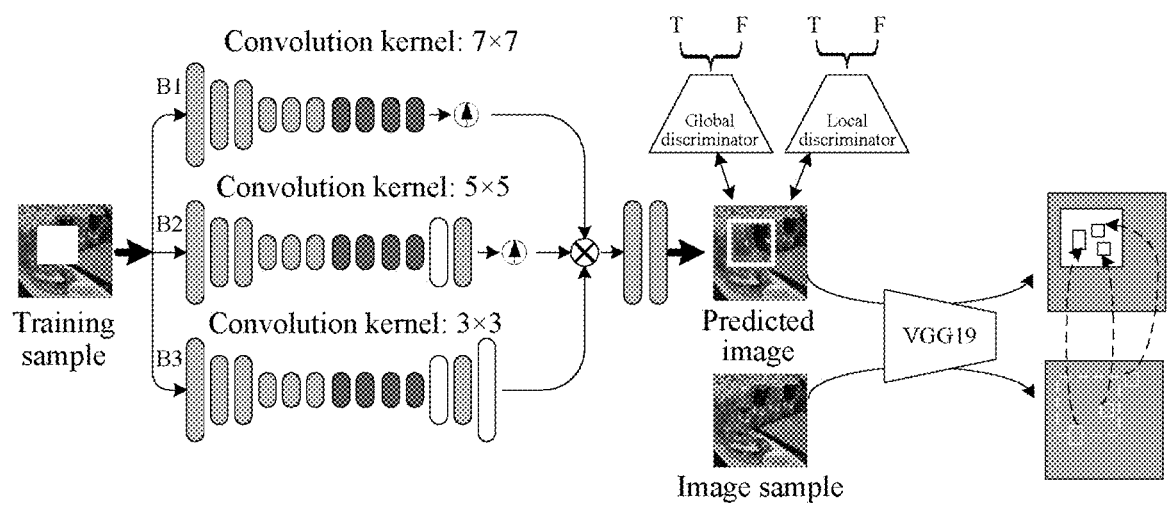
FIG. 2A is an example diagram of training a multi-column convolutional neural network according to an embodiment of the disclosure.

FIG. 2A is an example diagram of training a multi-column convolutional neural network according to an embodiment of the disclosure. As shown in FIG. 2, the multi-column convolutional neural network includes three subnetworks B1, B2, and B3 connected in parallel, and the structure of each subnetwork may be as follows:

The encoder part of B1 may sequentially include six convolutional layers, the decoder part may sequentially include four dilated convolutional layers, and a convolution kernel size may be set to "7×7".

The encoder part of B2 may sequentially include six convolutional layers, the decoder part may sequentially include four dilated convolutional layers, one deconvolution layer, and one convolutional layer, and a convolution kernel size may be set to "5×5".

The encoder part of B3 may sequentially include six convolutional layers, the decoder part may sequentially include four dilated convolutional layers, one deconvolution layer, one convolutional layer, and one deconvolution layer, and a convolution kernel size may be set to "3×3", or the like.

In this case, feature extraction is performed on the non-inpainting sample region in the training sample by using the subnetworks B1, B2, and B3 respectively, to obtain feature information corresponding to the subnetwork B1, feature information corresponding to the subnetwork B2, and feature information corresponding to the subnetwork B3. Both spatial resolutions outputted by the subnetworks B1 and B2 are different from that of an inputted training sample. Therefore, after the spatial resolutions outputted by B1 and B2 are upsampled to the original spatial resolution (that is, the spatial resolution of the training sample), the feature information outputted by B1, B2, and B3 is concatenated, to obtain a concatenated feature map. The concatenated feature map is then mapped to the image space by using a shared decoding part (that is, a shared decoder), to obtain a mapped image. Next, a texture of the to-be-inpainted sample region may be obtained from the mapped image, and the to-be-inpainted sample region in the training sample is filled with the obtained texture, to obtain the predicted image.

There may be a plurality of manners of constructing loss functions. An example manner may be as follows:

(1) Reconstruction Loss Function

The network device may obtain a mask corresponding to the labeled region, perform convolution processing on the mask by using a Gaussian filter, to obtain a loss weight mask, and then construct the reconstruction loss function according to the loss weight mask, the image sample, and the predicted image.

(2) Regularization Loss Function

As shown in FIG. 2A, the network device may separately classify pixel types in the predicted image and the image sample by using the VGG; separately obtain output values of the predicted image and the image sample in each convolutional layer of the image classification model during the classification; calculate an ID-MRF loss between the output value of the predicted image and the output value of the image sample in the each convolutional layer; and construct the regularization loss function according to the calculated ID-MRF loss of each layer.

As shown in FIG. 2A, the content (that is, the generated texture used for filling the to-be-inpainted region) generated by the network may be minimized by using the regularization loss function, and the network may be optimized by using a difference between the minimized content and the nearest neighbors in the image sample.

(3) Adversarial Loss Function

Referring to FIG. 2A, the network device may calculate an interpolation between the predicted image and the image sample, then process the interpolation by using the preset global discriminator, to obtain a global probability (in FIG. 2A, T represents "True", and F represents "False") corresponding to the interpolation, process the interpolation by using the local discriminator, to obtain a local probability (in FIG. 2A, T represents "True", and F represents "False") corresponding to the interpolation, and then calculate a direct mean of the global probability corresponding to the interpolation and the local probability corresponding to the interpolation, to obtain the probability corresponding to the interpolation.

Similarly, referring to FIG. 2A, the network device may alternatively process the predicted image by using the preset global discriminator, to obtain a global probability (in FIG. 2A, T represents "True", and F represents "False") corresponding to the predicted image, process the predicted image by using the local discriminator, to obtain a local probability (in FIG. 2A, T represents "True", and F represents "False") corresponding to the predicted image, and then calculate a direct mean of the global probability corresponding to the predicted image and the local probability corresponding to the predicted image, to obtain the probability corresponding to the predicted image.

After the probability corresponding to the interpolation and the probability corresponding to the predicted image are obtained, the adversarial loss function may be constructed according to the probability corresponding to the interpolation, the probability corresponding to the predicted image, and the loss weight mask.

If the loss weight mask $M_w$ has been obtained before, the loss weight mask only needs to be read directly. If the loss weight mask cannot be read, a mask corresponding to the labeled region may be obtained, and convolution processing is performed on the mask by using the Gaussian filter, to calculate the loss weight mask $M_w$. For an example calculation method of the loss weight mask, the foregoing embodiments may be referred to. Details are not described herein.

After the reconstruction loss function, the regularization loss function, and the adversarial loss function are obtained, an optimization loss function L may be generated according to the reconstruction loss function, the regularization loss function, and the adversarial loss function as follows:

$$L = L_c + \lambda_{mrf} L_{mrf} + \lambda_{adv} L_{adv}.$$

$\lambda_{mrf}$ and $\lambda_{adv}$ are regular term coefficients, which may be specifically set according to requirements for an actual application.

Subsequently, the multi-column convolutional neural network may be converged by using the optimization loss function, to complete one-time training.

Subsequently, the network device may return to perform the operation of "randomly selecting an image sample from the acquired plurality of image samples as a current image sample", to obtain another current image sample, and train the multi-column convolutional neural network by using the foregoing training method, and the process is repeated until all image samples are trained, to obtain the trained multi-column convolutional neural network.

(2) Trained Multi-Column Convolutional Neural Network

After the trained multi-column convolutional neural network is obtained, the target image may be inpainted based on the trained multi-column convolutional neural network.

Figure 2B:
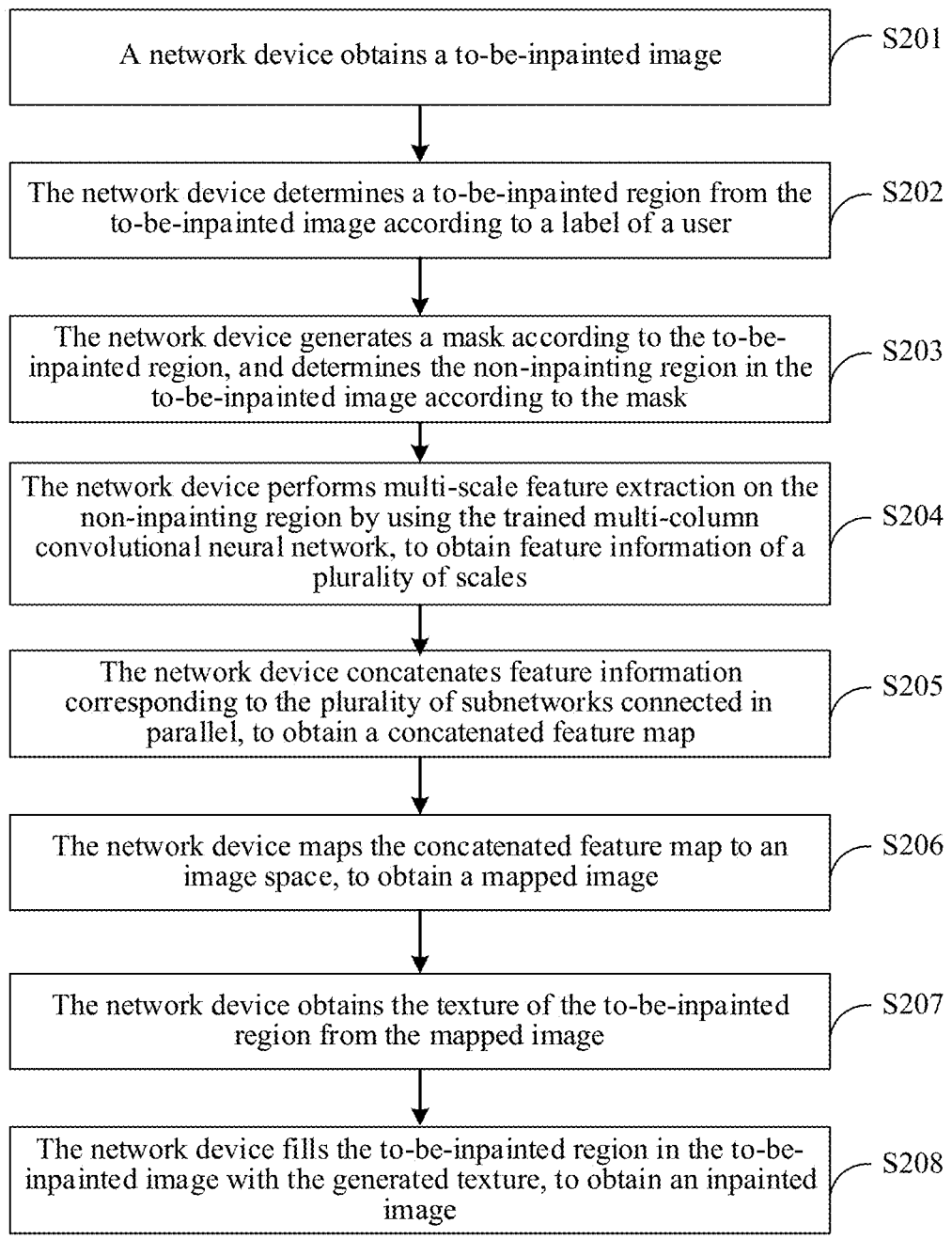
FIG. 2B is another schematic flowchart of an image inpainting method according to an embodiment of the disclosure.

FIG. 2B is another schematic flowchart of an image inpainting method according to an embodiment of the disclosure. As shown in FIG. 2B, an example procedure of the method may include the following operations S201-S208:

S201. The network device obtains a target image (or a to-be-inpainted image).

For example, the network device may read the target image locally (that is, the network device), or obtain the target image from another device.

S202. The network device determines a to-be-inpainted region from the target image according to a label (the label indicates a region that is to be inpainted) of a user.

Figure 2C:
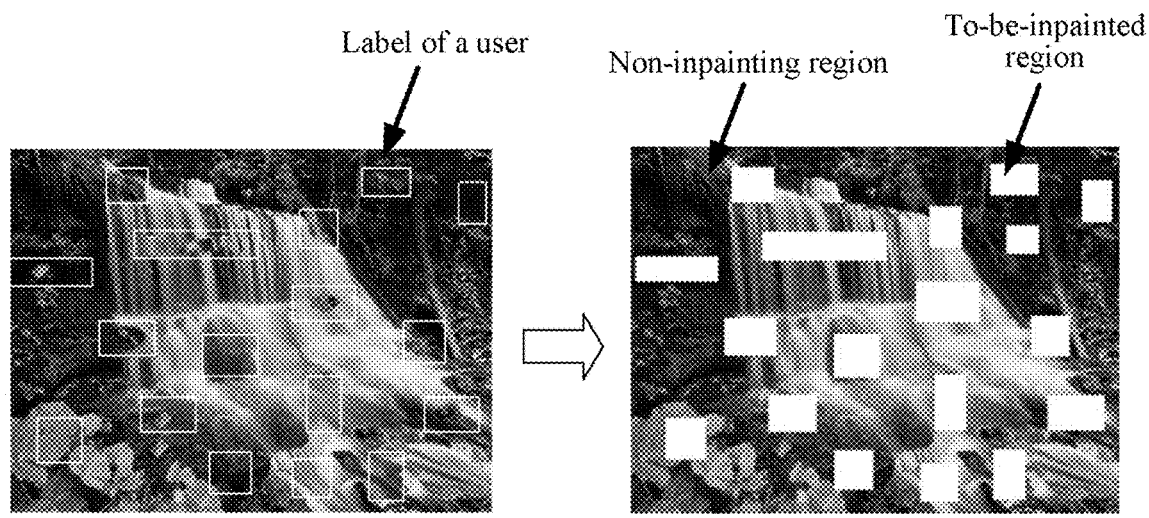
FIG. 2C is an example diagram of dividing a to-be-inpainted region and a non-inpainting region according to an embodiment of the disclosure.

If the target image already includes the label of the user, the to-be-inpainted region may be directly determined from the target image according to the label of the user. If the target image does not include the label of the user, the label of the user may be received, and the to-be-inpainted region is then determined from the target image according to the label of the user. For example, for details, reference may be made to FIG. 2C. In FIG. 2C, a region within a white box denotes the to-be-inpainted region, and there may be one or more to-be-inpainted regions.

S203. The network device generates a mask according to the to-be-inpainted region, and determines the non-inpainting region in the target image according to the mask.

For example, the value of the mask of the to-be-inpainted region in the target image may be set to 1, and the value of a mask of another region is set to 0. In this case, the region with the value of 0 may be determined as the non-inpainting region. This is expressed by using a formula as follows:

$$X = Y \odot (1-M).$$

X is the non-inpainting region, Y is the to-be-inpainted region, M is the mask, and $\odot$ is an operation of multiplying corresponding elements.

That is, in the target image, except for the to-be-inpainted region, the another region is the non-inpainting region. FIG. 2C shows an example of dividing a to-be-inpainted region and a non-inpainting region according to an embodiment of the disclosure. Referring to FIG. 2C, except for the region within the white box in FIG. 2C, the another region is the non-inpainting region.

S204. The network device performs multi-scale feature extraction on the non-inpainting region by using the trained multi-column convolutional neural network, to obtain the feature information of the plurality of scales.

Figure 2D:
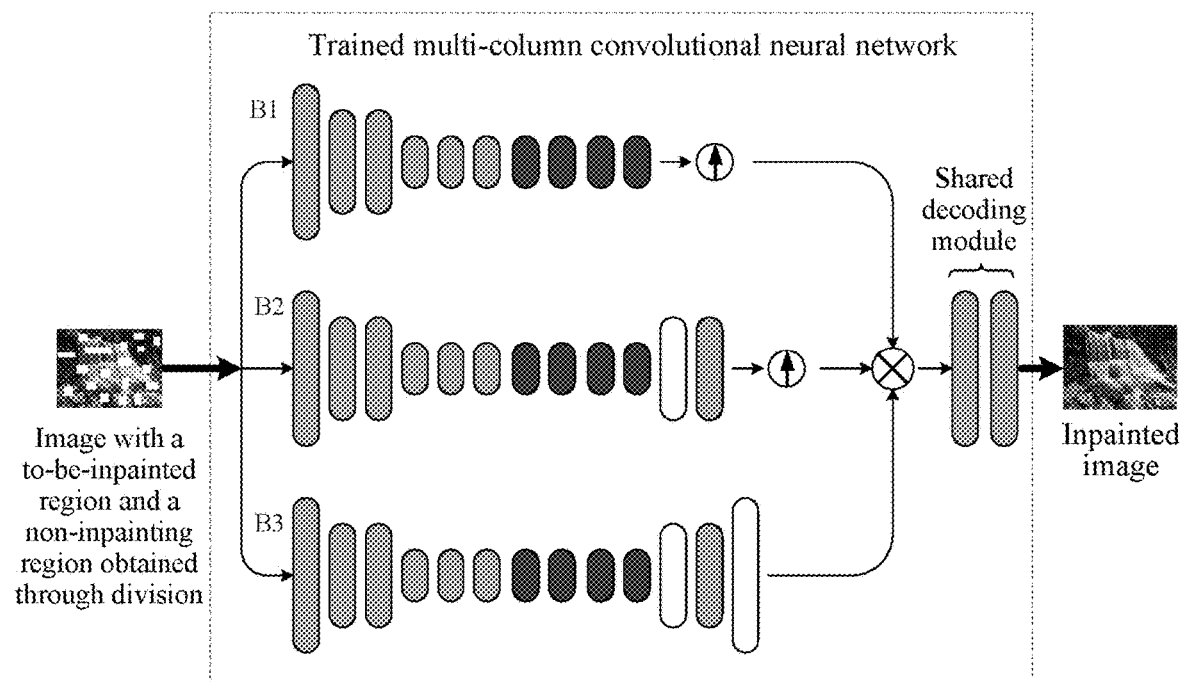
FIG. 2D is an example diagram of a scenario of an image inpainting method according to an embodiment of the disclosure.

FIG. 2D is an example diagram of a scenario of an image inpainting method according to an embodiment of the disclosure. As shown in FIG. 2D, after the target image is divided into the to-be-inpainted region and the non-inpainting region (that is, the to-be-inpainted region and the non-inpainting region are determined), the target image with the to-be-inpainted region and the non-inpainting region may be inputted into the trained multi-column convolutional neural network. Feature extraction is then performed on the non-inpainting region in the target image by using the subnetworks B1, B2, and B3 of the trained multi-column convolutional neural network respectively, to obtain feature information corresponding to the subnetwork B1, feature information corresponding to the subnetwork B2, and feature information corresponding to the subnetwork B3.

S205. The network device concatenates the feature information corresponding to the plurality of subnetworks connected in parallel, to obtain a concatenated feature map.

For example, in operation S204, the feature information corresponding to the subnetwork B1, the feature information corresponding to the subnetwork B2, and the feature information corresponding to the subnetwork B3 are obtained. In this case, the network device may concatenate the feature information corresponding to the subnetwork B1, the feature information corresponding to the subnetwork B2, and the feature information corresponding to the subnetwork B3, to obtain a concatenated feature map.

If spatial resolutions of feature information (e.g., feature maps) outputted by some subnetworks are different from spatial resolutions of an originally inputted target image, to better concatenate outputs of these subnetworks, an upsampling operation may further be performed by using the feature information outputted by these subnetworks, to adjust the spatial resolutions of the feature information to the original spatial resolutions (that is, the spatial resolutions of the originally inputted target image). For example, referring to FIG. 2D, it may be learned from the figure that, both spatial resolutions outputted by the subnetworks B1 and B2 are different from that of an inputted target image. Therefore, in this case, after the spatial resolutions may be upsampled to the original spatial resolution, feature information outputted by subnetworks B1, B2, and B3 is then concatenated, to obtain a concatenated feature map.

S206. The network device maps the concatenated feature map to an image space, to obtain a mapped image.

For example, the network device may map the concatenated feature map to an image space by using a shared decoding module, to obtain a mapped image. The shared decoding module may be implemented by using a plurality of convolutional layers, and a quantity of convolutional layers may be determined according to requirements for an actual application. For example, referring to FIG. 2D, the shared decoding module may be implemented by using two convolutional layers.

S207. The network device obtains the texture of the to-be-inpainted region from the mapped image.

There may be a plurality of manners of obtaining a texture of the to-be-inpainted region. For example, first, a position of the to-be-inpainted region in the target image may be determined; a region whose position in the mapped image is the same as the determined position is then used as a target region, and a texture of the target region is obtained, to obtain the texture of the to-be-inpainted region.

S208. The network device fills the to-be-inpainted region in the target image with the obtained texture, to obtain an inpainted image.

For example, as shown in FIG. 2D, the procedure may include: filling the to-be-inpainted region with the obtained texture by using a migration learning algorithm, to obtain an inpainted region, and then concatenating the inpainted region and the non-inpainting region, to obtain the inpainted image. This is expressed by using a formula as follows:

$$\hat{Y}=Y\odot(1-M)+G([X,M])\odot M$$

$\hat{Y}$ is the inpainted image, Y is the to-be-inpainted region, X is the non-inpainting region, M is the mask, $Y\odot(1-M)$ is the non-inpainting region, G([X, M]) is the inpainted region, and $\odot$ is an operation of multiplying corresponding elements.

After the target image is inpainted by using the trained multi-column convolutional neural network, for the effect of the inpainted image, reference may be made to FIG. 2E. Other than a "landscape image" shown in this embodiment, the image inpainting method is also applicable to other types of images, such as a portrait and a building image. Details are not described herein.

It may be learned from the above that, in an embodiment, a multi-column convolutional neural network may be pre-trained, and during training, the network is optimized by using the reconstruction loss function, the regularization loss function, and the adversarial loss function, to obtain a trained multi-column convolutional neural network. Subsequently, multi-scale feature extraction may be performed on the non-inpainting region in the target image by using the trained multi-column convolutional neural network, and a texture of the to-be-inpainted region in the target image is generated based on the feature extraction, to fill the to-be-inpainted region, and further, to obtain an inpainted image. Because the multi-column convolutional neural network according to an example embodiment uses the plurality of subnetworks connected in parallel, and different receptive fields and spatial resolutions are set for the each subnetwork, compared with a conventional neural network such as a network of a single-stream encoding-decoding network structure (feature extraction is from coarse extraction to fine extraction, that is, the latter simply inherits previous information), the multi-column convolutional neural network may overcome a limitation (for example, if there is an error in coarse-grained processing of the network in the early stage, subsequent refinement processing is greatly affected) on the coarse-to-fine structure, and even if a part of the coarse-grained processing is incorrect, the effect on the subsequent processing may be minimized. In addition, although the subnetworks seem to be independent of each other, the subnetworks also affect each other during training due to the shared decoding part. That is, the subnetworks may complement each other instead of simply inheriting information, thereby ensuring the accuracy of outputs of the trained multi-column convolutional neural network. That is, the target image is inpainted by using the trained multi-column convolutional neural network, thereby greatly improving the inpainting accuracy. In addition, feature extraction may be performed on the non-inpainting region from different scales by using the trained multi-column convolutional neural network, and a texture is generated based on the feature extraction, so that the generated texture is more diverse. Therefore, in the solution according to an example embodiment, a target with high structural strength or a large region may be adequately inpainted, thereby greatly enhancing the authenticity of an inpainted region, and improving the inpainting effect.

Correspondingly, the embodiments of the disclosure further provide another image inpainting method, including: obtaining a target image, and receiving selection information of a user on a region that is to be inpainted in the target image; determining a to-be-inpainted region and a non-inpainting region from the target image according the selection information of the user; performing feature extraction on the non-inpainting region based on different receptive fields and spatial resolutions, to obtain feature information of a plurality of scales; generating a texture of the to-be-inpainted region according to the feature information of the plurality of scales; filling the to-be-inpainted region in the target image with the generated texture, to obtain an inpainted image; and displaying the inpainted image.

The image inpainting method may be performed by an image inpainting apparatus. The image inpainting apparatus may be installed in a device such as a terminal in the form of a client. For example, an example in which the image inpainting apparatus is installed in the terminal in the form of a client is used. As shown in FIG. 3A, the image inpainting method may specifically include the following operations S301-S306:

S301. The terminal obtains a target image (or a to-be-inpainted image).

For example, when the client is started, the terminal may obtain the target image locally, for example, from an album, according to the selection of the user, or may obtain the target image by starting a camera component (for example, a video camera of the terminal), or may receive the target image transmitted by another device (for example, a camera or another terminal or server).

S302. The terminal receives selection information triggered by a user based on the target image, the selection information indicating a region that is to be inpainted in the target image.

Figure 3B:
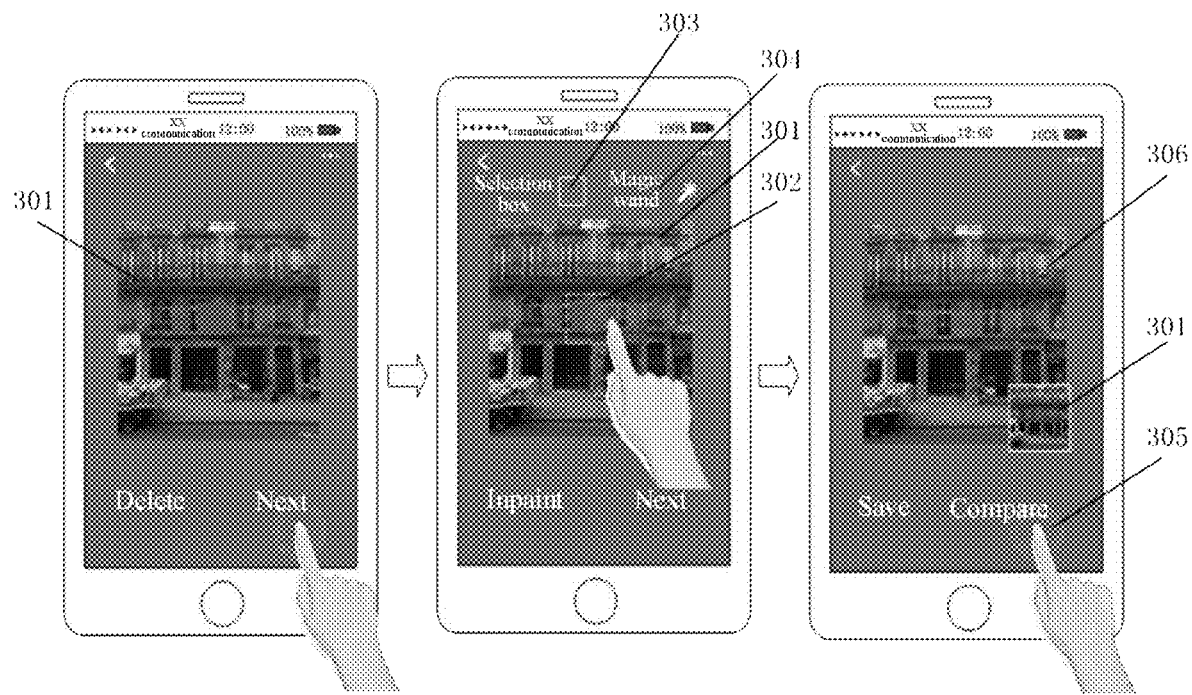
FIG. 3B is a schematic diagram of another scenario of an image inpainting method according to an embodiment of the disclosure.

FIG. 3B is a schematic diagram of another scenario of an image inpainting method according to an embodiment of the disclosure. As shown in the left figure in FIG. 3B, after obtaining a target image 301, the terminal may display the target image 301 in a terminal interface for the user to browse. The user may select a region that is to be inpainted in the target image 301, for example, a frame region that is to be inpainted in the target image 301 (the region 302 within the white box in FIG. 3B). After the user selects the region, the terminal may generate selection information according to the region selected by the user.

An operation interface may be provided, and a plurality of interfaces may be provided in the operation interface. Different interfaces correspond to different selection tools, such as a selection box or a magic wand. When the user clicks a selection tool, a corresponding interface is triggered, and corresponding operation instructions are generated. In this way, the terminal may display an icon of the corresponding selection tool, such as a selection box 303 or a magic wand 304, in the target image based on the operation instructions. In this way, for example, as shown in the middle figure in FIG. 3B, the user visually performs operations in the target image through the displayed icon, to select the region that is to be inpainted.

S303. The terminal determines a to-be-inpainted region and a non-inpainting region from the target image according to the selection information of the user.

For example, referring to FIG. 3, the terminal may determine that the region 302 within the white box is the to-be-inpainted region according to the selection information of the user, and the another region except for the to-be-inpainted region is the non-inpainting region.

S304. The terminal performs feature extraction on the non-inpainting region based on different receptive fields and spatial resolutions, to obtain feature information of a plurality of scales.

For example, the terminal may obtain a trained multi-column convolutional neural network, and perform multi-scale feature extraction on the non-inpainting region by using the trained multi-column convolutional neural network, to obtain the feature information of the plurality of scales. For details, reference may be made to the foregoing embodiments. Details are not described herein.

S305. The terminal generates a texture of the to-be-inpainted region according to the feature information of the plurality of scales, and fills the to-be-inpainted region in the target image with the generated texture, to obtain an inpainted image. For details, reference may be made to the foregoing embodiments. Details are not described herein.

S306. The terminal displays the inpainted image.

For example, the terminal may display the inpainted image on a terminal screen. For example, as shown in the right figure in FIG. 3B, an inpainted image 306 may be displayed in the middle of a screen interface of the terminal in the form of a large image.

To help the user experience the inpainting effect, as shown in FIG. 3B, a "compare" trigger key 305 may be disposed in a preset position (e.g., a lower portion) of the screen interface. When the user triggers the "compare" trigger key 305, the terminal may display the target image 301 in the form of a small image, to help the user compare the target image with the inpainted image. Alternatively, when the user triggers the "compare" trigger key 305, for example, touches and holds the "compare" trigger key 305, the terminal masks the inpainted image 306 with the target image 301 for display. When the user releases the "compare" trigger key 305, the display of the inpainted image 306 may be restored (that is, the target image is not displayed). The disclosure is not limited there to, and various implementations may be determined according to requirements for an actual application, and are not described herein.

It may be learned from above that, in an example embodiment, after obtaining a target image, the terminal may receive selection information of the user, determine a to-be-inpainted region and a non-inpainting region from the target image according to the selection information of the user, then perform feature extraction on the non-inpainting region based on different receptive fields and spatial resolutions, generate a texture of the to-be-inpainted region according to the feature information of a plurality of scales obtained through extraction, and fill the to-be-inpainted region in the target image with the generated texture, to obtain an inpainted image for display. Because feature extraction may be performed from a plurality of scales and a texture is generated based on the feature extraction, according to example embodiments, the generated texture is more diverse. Accordingly, a target with high structural strength or a large region may be adequately inpainted, thereby greatly enhancing the authenticity of an inpainted region, and improving the inpainting effect.

To implement the foregoing method, the example embodiments of the disclosure further provide an image inpainting apparatus. The image inpainting apparatus may be integrated in a network device, for example, a device such as a server or a terminal. The terminal may include a mobile phone, a tablet computer, a notebook computer and/or a PC.

Figure 4A:
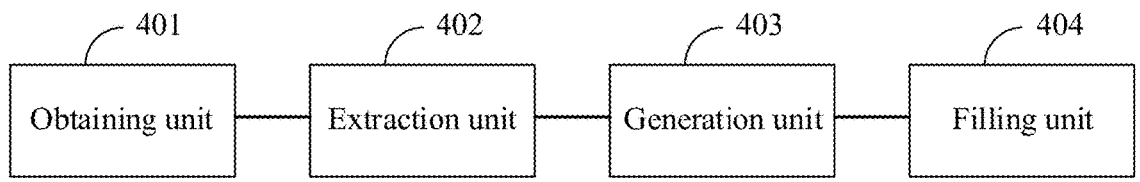
FIG. 4A is a schematic structural diagram of an image inpainting apparatus according to an embodiment of the disclosure.

For example, as shown in FIG. 4A, the image inpainting apparatus may include an obtaining unit 401, an extraction unit 402, a generation unit 403 and a filling unit 404. Functions of the units are as follows:

(1) Obtaining Unit 401

The obtaining unit 401 is configured to: obtain a target image, and determine a to-be-inpainted region and a non-inpainting region from the target image.

For example, the obtaining unit 401 may be configured to: determine a to-be-inpainted region from the target image according to a label of a user; generate a mask according to the to-be-inpainted region; and determine the non-inpainting region in the target image according to the mask.

In some embodiments, the obtaining unit 401 may further be configured to: obtain a target image, and receive selection information of a user on a region that is to be inpainted in the target image; and determine a to-be-inpainted region and a non-inpainting region from the target image according to the selection information of the user.

(2) Extraction Unit 402

The extraction unit 402 is configured to perform feature extraction on the non-inpainting region based on different receptive fields and spatial resolutions, to obtain feature information of a plurality of scales.

For example, the extraction unit 402 may be configured to: obtain a trained multi-column convolutional neural network, and perform multi-scale feature extraction on the non-inpainting region by using the trained multi-column convolutional neural network, to obtain the feature information of the plurality of scales.

The trained multi-column convolutional neural network may include a plurality of subnetworks connected in parallel, and different receptive fields and spatial resolutions are set for different subnetworks, to extract feature information of different scales.

For example, the extraction unit 402 may be configured to: separately perform feature extraction on the non-inpainting region by using the plurality of subnetworks connected in parallel, to obtain feature information corresponding to each subnetwork.

Both a quantity of subnetworks and network parameters may be determined according to requirements for an actual application. For example, there may be three subnetworks connected in parallel. For details, reference may be made to the foregoing method embodiments. Details are not described herein.

(3) Generation Unit 403

The generation unit 403 is configured to generate a texture of the to-be-inpainted region according to the feature information of the plurality of scales.

For example, an example in which the trained multi-column convolutional neural network may include the plurality of subnetworks connected in parallel may be used. In this case, the generation unit 403 may be configured to generate the texture of the to-be-inpainted region according to the feature information corresponding to the plurality of subnetworks connected in parallel.

For example, the generation unit 403 may be configured to: concatenate feature information corresponding to the each subnetwork, to obtain a concatenated feature map; map the concatenated feature map to an image space, to obtain a mapped image; and obtain the texture of the to-be-inpainted region from the mapped image.

For example, the generation unit 403 may be configured to: map the concatenated feature map to an image space by using a shared decoding module, to obtain a mapped image. The shared decoding module may be implemented by using a plurality of convolutional layers, and a quantity of convolutional layers may be determined according to requirements for an actual application.

There may be a plurality of manners of obtaining the texture of the to-be-inpainted region from the mapped image. For example, an example manner may be as follows:

The generation unit 403 is configured to: determine a position of the to-be-inpainted region in the target image, use a region whose position in the mapped image is the same as the position as a target region, and obtain a texture of the target region, to obtain the texture of the to-be-inpainted region.

If spatial resolutions of feature information outputted by some subnetworks are different from spatial resolutions of an originally inputted target image, to better concatenate outputs of these subnetworks, the generation unit 403 may further perform an upsampling operation by using the feature information outputted by these subnetworks, to adjust the spatial resolutions to the original spatial resolutions of the feature information, and then perform concatenation again.

(4) Filling Unit 404

The filling unit 404 is configured to fill the to-be-inpainted region in the target image with the generated texture, to obtain an inpainted image.

For example, the filling unit 404 may be configured to: fill the to-be-inpainted region with the generated texture by using a migration learning algorithm, to obtain an inpainted region, and then concatenate the inpainted region and the non-inpainting region, to obtain the inpainted image.

Figure 4B:
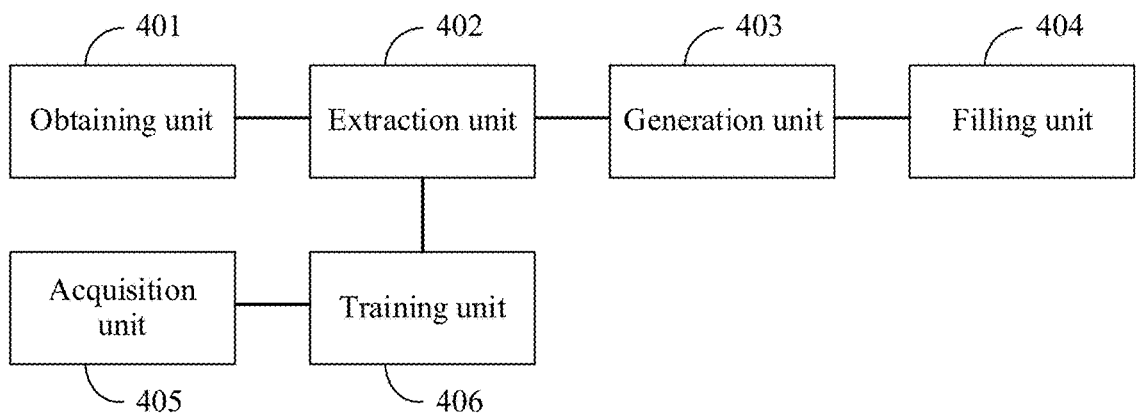
FIG. 4B is another schematic structural diagram of an image inpainting apparatus according to an embodiment of the disclosure.

The trained multi-column convolutional neural network may be preset by an operation and maintenance personnel, or may be obtained through training by the image inpainting apparatus. That is, as shown in FIG. 4B, the image inpainting apparatus may further include an acquisition unit 405 and a training unit 406 as follows:

The acquisition unit 405 is configured to acquire a plurality of image samples.

For example, the acquisition unit 405 may obtain a large number of image samples from other image acquisition devices such as a video camera, a camera, and a monitor, or may read a large number of image samples from a gallery, or may obtain image samples through a network.

The training unit 406 is configured to train a preset multi-column convolutional neural network according to the image samples, to obtain the trained multi-column convolutional neural network.

Figure 4C:
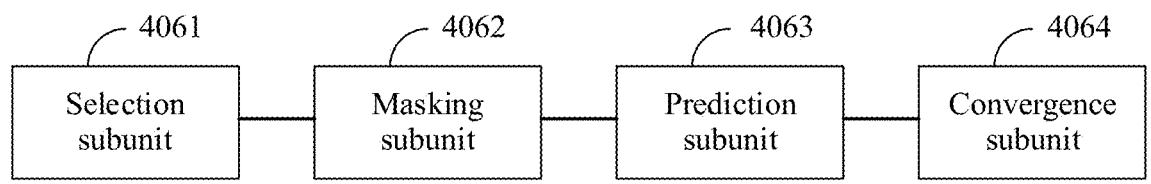
FIG. 4C is a schematic structural diagram of a training unit according to an embodiment of the disclosure.

In some embodiments, FIG. 4C is a schematic structural diagram of a training unit. As shown in FIG. 4C, the training unit 406 may include a selection subunit 4061, a masking subunit 4062, a prediction subunit 4063, and a convergence subunit 4064. Functions of the units are as follows:

The selection subunit 4061 is configured to randomly select a region from the image sample as a labeled region.

For example, the selection subunit 4061 may be configured to: randomly select an image sample from the acquired plurality of image samples as a current image sample, and then use a region randomly selected from the current image sample as the labeled region.

The masking subunit 4062 is configured to mask the labeled region in the image sample, to obtain a training sample.

For example, the masking subunit 4062 may be configured to: generate a mask according to the labeled region, and concatenate the generated mask and the image sample, to obtain the training sample.

The prediction subunit 4063 is configured to predict a texture of the labeled region in the training sample by using the preset multi-column convolutional neural network, to obtain a predicted image.

For example, the prediction subunit 4063 may be configured to: determine a to-be-inpainted sample region and a non-inpainting sample region in the training sample according to the labeled region; perform multi-scale feature extraction on the training sample by using the preset multi-column convolutional neural network, to obtain feature information of a plurality of scales corresponding to the non-inpainting sample region; generate a texture of the to-be-inpainted sample region according to the obtained feature information of the plurality of scales; and fill the to-be-inpainted sample region in the training sample with the generated texture, to obtain the predicted image.

The convergence subunit 4064 is configured to verify the predicted image by using the image sample to converge the multi-column convolutional neural network, to obtain the trained multi-column convolutional neural network.

For example, the convergence subunit 4064 is configured to: separately construct a reconstruction loss function, a regularization loss function, and an adversarial loss function according to the predicted image and the image sample; generate an optimization loss function according to the reconstruction loss function, the regularization loss function, and the adversarial loss function; and converge the multi-column convolutional neural network by using the optimization loss function, to obtain the trained multi-column convolutional neural network.

There may be a plurality of manners of constructing loss functions. For example, an example manner may be as follows:

(1) Reconstruction Loss Function

The convergence subunit 4064 is configured to: obtain a mask corresponding to the labeled region, and perform convolution processing on the mask by using a Gaussian filter, to obtain a loss weight mask; and construct the reconstruction loss function according to the loss weight mask, the image sample, and the predicted image.

(2) Regularization Loss Function

The convergence subunit 4064 may be configured to: separately classify pixel types in the predicted image and the image sample by using an image classification model; separately obtain output values of the predicted image and the image sample in each convolutional layer of the image classification model during the classification; calculate an ID-MRF loss between the output value of the predicted image and the output value of the image sample in the each convolutional layer; and construct the regularization loss function according to the calculated ID-MRF loss of each layer.

(3) Adversarial Loss Function

The convergence subunit 4064 may be configured to: calculate an interpolation between the predicted image and the image sample; process the interpolation by using a preset discriminator, to obtain a probability corresponding to the interpolation; process the predicted image by using the preset discriminator, to obtain a probability corresponding to the predicted image; obtain a mask corresponding to the labeled region, and perform convolution processing on the mask by using a Gaussian filter, to obtain a loss weight mask; and construct the adversarial loss function according to the probability corresponding to the interpolation, the probability corresponding to the predicted image, and the loss weight mask.

During specific implementation, the foregoing units may be implemented as independent entities, or may be randomly combined, or may be implemented as a same entity or several entities. For example implementation of the foregoing units, the foregoing method embodiments may be referred to. Details are not described herein again.

It may be learned from above that, in an example embodiment, after obtaining a target image, the image inpainting apparatus may determine a to-be-inpainted region and a non-inpainting region from the target image by using the obtaining unit 401, and perform multi-scale feature extraction on the non-inpainting region by using the trained multi-column convolutional neural network by using the extraction unit 402. The generation unit 403 then generates a texture of the to-be-inpainted region according to the feature information of a plurality of scales obtained through extraction, and the filling unit 404 fills the to-be-inpainted region in the target image with the generated texture, to obtain an inpainted image. Because feature extraction may be performed from a plurality of scales in this solution, and a texture is generated based on the feature extraction, the generated texture is more diverse. Accordingly, a target with high structural strength or a large region may be adequately inpainted, thereby greatly enhancing the authenticity of an inpainted region, and improving the inpainting effect.

Figure 5:
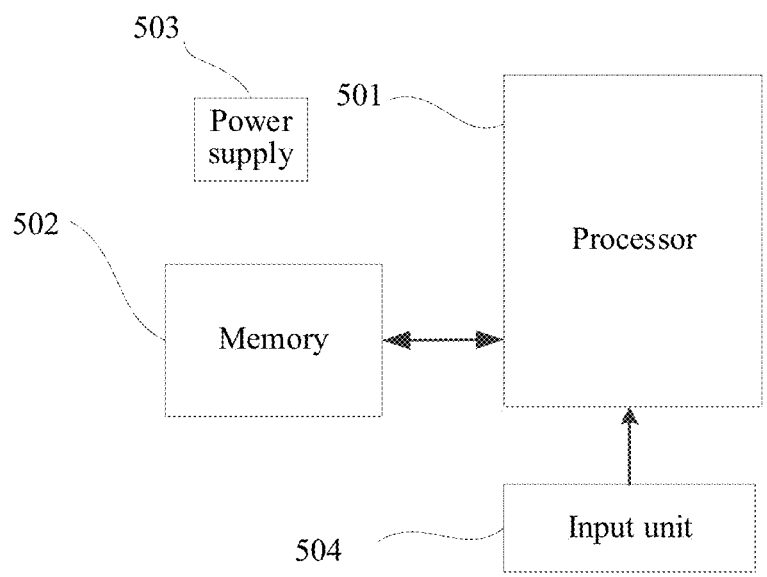
FIG. 5 is a schematic structural diagram of a computer device according to an embodiment of the disclosure.

The embodiments of the disclosure further provide a computer device. FIG. 5 is a schematic structural diagram of a computer device according to an embodiment of the disclosure. Specifically:

The computer device may include components such as a processor 501 including one or more processing cores, a memory 502 including one or more computer-readable storage media, a power supply 503, and an input unit 504. A person skilled in the art may understand that, the structure of the computer device shown in FIG. 5 does not constitute a limitation to the computer device. The computer device may include components that are more or fewer than those shown in the figure, or some components may be combined, or a different component deployment may be used.

The processor 501 is a control center of the computer device, and is connected to various parts of the entire computer device by using various interfaces and/or lines. By running or executing software programs and/or modules stored in the memory 502, and invoking data stored in the memory 502, the processor performs various functions and data processing of the computer device, thereby performing overall monitoring on the computer device. The processor 501 may include one or more processing cores. The processor 501 may integrate an application processor and a modem processor. The application processor mainly processes an operating system, a user interface, an application program, and the like. The modem processor mainly processes wireless communication. It may be understood that the foregoing modem processor may alternatively not be integrated into the processor 501.

The memory 502 may be configured to store a software program and module. The processor 501 runs the software program and module stored in the memory 502, to implement various functional applications and data processing. The memory 502 may mainly include a program storage area and a data storage area. The program storage area may store an operating system, an application program required by at least one function (for example, a sound playback function and an image display function), and the like. The data storage area may store data created according to use of the computer device, and the like. In addition, the memory 502 may include a high speed random access memory, and may also include a non-volatile memory, such as at least one magnetic disk storage device, a flash memory, or another volatile solid-state storage device. Correspondingly, the memory 502 may further include a memory controller, so that the processor 501 may access the memory 502.

The computer device further includes the power supply 503 for supplying power to the components. The power supply 503 may be logically connected to the processor 501 by using a power management system, thereby implementing functions such as charging, discharging, and power consumption management by using the power management system. The power supply 503 may further include one or more of a direct current or alternating current power supply, a re-charging system, a power failure detection circuit, a power supply converter or inverter, a power supply state indicator, and any other components.

The computer device may further include the input unit 504. The input unit 504 may be configured to receive input digit or character information and generate keyboard, mouse, joystick, optical, or trackball signal input related to user settings and function control.

Although not shown in the figure, the computer device may further include a display unit, and the like. Details are not described herein again. In an example embodiment, the processor 501 in the computer device may load executable files corresponding to processes of one or more application programs to the memory 502 according to the following instructions, and the processor 501 runs the application programs stored in the memory 502, to implement various functions:

obtaining a target image, and determining a to-be-inpainted region and a non-inpainting region from the target image; performing feature extraction on the non-inpainting region based on different receptive fields and spatial resolutions, to obtain feature information of a plurality of scales; generating a texture of the to-be-inpainted region according to the feature information of the plurality of scales; and filling the to-be-inpainted region in the target image with the generated texture, to obtain an inpainted image.

For example, the procedure may include: performing multi-scale feature extraction on the non-inpainting region by using the trained multi-column convolutional neural network, to obtain the feature information of the plurality of scales. The trained multi-column convolutional neural network may include a plurality of subnetworks connected in parallel, and different receptive fields and spatial resolutions are set for different subnetworks, to extract feature information of different scales. The trained multi-column convolutional neural network may be preset by operation and maintenance personnel, or may be obtained through training by the computer device. For an example training manner, the foregoing embodiments may be referred to. Details are not described herein.

It may be learned from above that, in an example embodiment, after obtaining a target image, the computer device may determine a to-be-inpainted region and a non-inpainting region from the target image, perform feature extraction on the non-inpainting region based on different receptive fields and spatial resolutions, then generate a texture of the to-be-inpainted region according to the feature information of a plurality of scales obtained through extraction, and fill the to-be-inpainted region in the target image with the generated texture, to obtain an inpainted image. Because feature extraction may be performed from a plurality of scales in this solution, and a texture is generated based on feature extraction, the generated texture is more diverse, so that a target with high structural strength or a large region may be adequately inpainted, thereby greatly enhancing the authenticity of an inpainted region, and improving the inpainting effect.

A person of ordinary skill in the art may understand that, all or some operations of the methods in the foregoing embodiments may be implemented by using instructions, or implemented through instructions controlling relevant hardware, and the instructions may be stored in a computer-readable storage medium and loaded and executed by a processor.

Accordingly, the embodiments of the disclosure provide a non-volatile computer-readable storage medium, storing a plurality of instructions, the instructions being configured to be loaded by the processor, to perform the operations of any image inpainting method according to the embodiments of the disclosure. For example, the instructions may perform the following operations:

obtaining a target image, and determining a to-be-inpainted region and a non-inpainting region from the target image; performing feature extraction on the non-inpainting region based on different receptive fields and spatial resolutions, to obtain feature information of a plurality of scales; generating a texture of the to-be-inpainted region according to the feature information of the plurality of scales; and filling the to-be-inpainted region in the target image with the generated texture, to obtain an inpainted image.

For example, the procedure may include: performing multi-scale feature extraction on the non-inpainting region by using the trained multi-column convolutional neural network, to obtain the feature information of the plurality of scales. The trained multi-column convolutional neural network may include a plurality of subnetworks connected in parallel, and different receptive fields and spatial resolutions are set for different subnetworks, to extract feature information of different scales.

For example implementations of the manner of training the trained multi-column convolutional neural network and the foregoing operations, the foregoing embodiments may be referred to. Details are not described herein again.

The storage medium may include: a read-only memory (ROM), a random access memory (RAM), a magnetic disk, an optical disc, or the like.

Because the instructions stored in the storage medium may perform the operations of any image inpainting method provided in the embodiments of the disclosure, the instructions may implement beneficial effects that may be implemented by any image inpainting method provided in the embodiments of the disclosure. For details, reference may be made to the foregoing embodiments. Details are not described herein again.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

An image inpainting method and apparatus, a storage medium and a computer device therefor provided in the embodiments of the disclosure are described above in detail. Although the principles and implementations of the disclosure are described by using example embodiments in this specification, the descriptions of the foregoing embodiments are merely intended to help understand the method and the core idea of the method of the disclosure. A person skilled in the art may make modifications to the specific implementations and application range according to the idea of the disclosure. In conclusion, the content of this specification is not to be construed as a limitation to the disclosure.

What is claimed is:

1. An image inpainting method, performed by at least one processor of a computer device, the method comprising:
   determining, from a target image, a first region to be inpainted and a second region that is not to be inpainted;
   performing feature extraction on the second region based on different receptive fields and spatial resolutions, to obtain feature information of a plurality of scales;
   generating a texture of the first region based on the feature information of the plurality of scales; and
   filling the first region in the target image with the generated texture, to obtain an inpainted image,
   wherein the performing the feature extraction comprises:
   obtaining a trained multi-column convolutional neural network, the trained multi-column convolutional neural network comprising a plurality of subnetworks connected in parallel, the different receptive fields and spatial resolutions being set for the plurality of subnetworks; and
   respectively performing the feature extraction on the second region by using the plurality of subnetworks, to obtain feature information corresponding to the plurality of subnetworks as the feature information of the plurality of scales.

2. The method according to claim 1, wherein the determining the first region and the second region from the target image comprises:
   determining the first region from the target image based on a label of a user;
   generating a mask based on the first region; and
   determining the second region based on the mask.

3. The method according to claim 2, further comprising:
   acquiring a plurality of image samples;
   randomly selecting a region from an image sample, of the plurality of image samples, as a labeled region;
   masking the labeled region in the image sample, to obtain a training sample;
   predicting a texture of the labeled region in the training sample by using a preset multi-column convolutional neural network, to obtain a predicted image; and
   verifying the predicted image by using the image sample, to converge the preset multi-column convolutional neural network and obtain the trained multi-column convolutional neural network.

4. The method according to claim 3, wherein the masking the labeled region comprises:
   generating a mask based on the labeled region; and
   concatenating the generated mask and the image sample, to obtain the training sample.

5. The method according to claim 3, wherein the predicting the texture of the labeled region comprises:
   determining, based on the labeled region, a first sample region to be inpainted and a second sample region that is not to be inpainted in the training sample;
   performing multi-scale feature extraction on the second sample region of the training sample by using the preset multi-column convolutional neural network, to obtain feature information of a plurality of scales corresponding to the second sample region;
   generating a texture of the first sample region based on the obtained feature information of the plurality of scales corresponding to the second sample region; and
   filling the first sample region in the training sample with the generated texture, to obtain the predicted image.

6. The method according to claim 3, wherein the verifying the predicted image comprises:
   constructing a reconstruction loss function, a regularization loss function, and an adversarial loss function according to the predicted image and the image sample;
   generating an optimization loss function according to the reconstruction loss function, the regularization loss function, and the adversarial loss function; and
   converging the preset multi-column convolutional neural network by using the optimization loss function, to obtain the trained multi-column convolutional neural network.

7. The method according to claim 6, wherein the constructing the reconstruction loss function comprises:
   obtaining a mask corresponding to the labeled region, and performing convolution processing on the mask by using a Gaussian filter, to obtain a loss weight mask; and
   constructing the reconstruction loss function according to the loss weight mask, the image sample, and the predicted image.

8. The method according to claim 6, wherein the constructing the regularization loss function comprises:
   classifying pixel types in the predicted image and the image sample by using an image classification model;
   obtaining an output value of the predicted image and an output value of the image sample in each convolutional layer of the image classification model during classification;
   calculating an implicit diversity Markov random field (ID-MRF) loss between the output value of the predicted image and the output value of the image sample in each convolutional layer; and
   constructing the regularization loss function according to the calculated ID-MRF loss of each convolutional layer.

9. The method according to claim 6, wherein the constructing the adversarial loss function comprises:
   calculating an interpolation between the predicted image and the image sample;
   processing the interpolation by using a preset discriminator, to obtain a probability corresponding to the interpolation;
   processing the predicted image by using the preset discriminator, to obtain a probability corresponding to the predicted image;
   obtaining a mask corresponding to the labeled region, and performing convolution processing on the mask by using a Gaussian filter, to obtain a loss weight mask; and
   constructing the adversarial loss function according to the probability corresponding to the interpolation, the probability corresponding to the predicted image, and the loss weight mask.

10. The method according to claim 1, wherein the generating the texture comprises:

concatenating the feature information corresponding to the plurality of subnetworks, to obtain a concatenated feature map;

mapping the concatenated feature map to an image space, to obtain a mapped image; and obtaining the texture of the first region from the mapped image.

11. The method according to claim 10, wherein the obtaining the texture comprises:

determining, as a target region, a region of which a position in the mapped image is the same as a position of the first region in the target image; and obtaining a texture of the target region as the texture of the first region.

12. The method according to claim 1, wherein the determining the first region and the second region from the target image comprises:

receiving selection information of a user on a region that is to be inpainted in the target image; and determining the first region and the second region from the target image according to the selection information of the user.

13. A non-transitory computer-readable storage medium, storing computer-readable program instructions, the computer-readable program instructions being executable by at least one processor to perform:

determining, from a target image, a first region to be inpainted and a second region that is not to be inpainted;

performing feature extraction on the second region based on different receptive fields and spatial resolutions, to obtain feature information of a plurality of scales;

generating a texture of the first region according to the feature information of the plurality of scales; and filling the first region in the target image with the generated texture, to obtain an inpainted image, wherein the performing the feature extraction comprises:

obtaining a trained multi-column convolutional neural network, the trained multi-column convolutional neural network comprising a plurality of subnetworks connected in parallel, the different receptive fields and spatial resolutions being set for the plurality of subnetworks; and respectively performing the feature extraction on the second region by using the plurality of subnetworks, to obtain feature information corresponding to the plurality of subnetworks as the feature information of the plurality of scales.

14. An image inpainting apparatus, comprising:

at least one memory configured to store program code; and at least one processor configured to read the program code and operate as instructed by the program code, the program code comprising:

determining code configured to cause at least one of the at least one processor to:

determine, from a target image, a first region to be inpainted and a second region that is not to be inpainted;

extraction code configured to cause at least one of the at least one processor to perform feature extraction on the second region based on different receptive fields and spatial resolutions, to obtain feature information of a plurality of scales;

generation code configured to cause at least one of the at least one processor to generate a texture of the first region based on the feature information of the plurality of scales; and filling code configured to cause at least one of the at least one processor to fill the first region in the target image with the generated texture, to obtain an inpainted image, wherein the extraction code is further configured to cause at least one of the at least one processor configured to:

obtain a trained multi-column convolutional neural network, the trained multi-column convolutional neural network comprising a plurality of subnetworks connected in parallel, the different receptive fields and spatial resolutions being set for the plurality of subnetworks; and respectively perform the feature extraction on the second region by using the plurality of subnetworks, to obtain feature information corresponding to the plurality of subnetworks as the feature information of a plurality of scales.

15. The apparatus according to claim 14, wherein the determining code is further configured to cause at least one of the at least one processor to: determine the first region from the target image based on a label of a user; generate a mask based on the first region; and determine the second region in the target image based on the mask.

16. The apparatus according to claim 15, wherein the program code further comprises:

selection code configured to cause at least one of the at least one processor to randomly select a region from an image sample as a labeled region;

masking code configured to cause at least one of the at least one processor to mask the labeled region in the image sample, to obtain a training sample;

prediction code configured to cause at least one of the at least one processor to predict a texture of the labeled region in the training sample by using a preset multi-column convolutional neural network, to obtain a predicted image; and convergence code configured to cause at least one of the at least one processor to verify the predicted image by using the image sample, to converge the preset multi-column convolutional neural network and obtain the trained multi-column convolutional neural network.

17. The apparatus according to claim 14, wherein the generation code is further configured to cause at least one of the at least one processor configured to: concatenate the feature information corresponding to the plurality of subnetworks, to obtain a concatenated feature map; map the concatenated feature map to an image space, to obtain a mapped image; and obtain the texture of the first region from the mapped image.

18. The apparatus according to claim 17, wherein the generation code is further configured to cause at least one of the at least one processor configured to: determine, as a target region, a region of which a position in the mapped image is the same as a position of the first region in the target image; and obtain a texture of the target region as the texture of the first region.

* * * * *